(12) United States Patent
Bangera et al.

(10) Patent No.: US 9,019,149 B2
(45) Date of Patent: Apr. 28, 2015

(54) METHOD AND APPARATUS FOR MEASURING THE MOTION OF A PERSON

(75) Inventors: Mahalaxmi Gita Bangera, Renton, WA (US); Roderick A. Hyde, Redmond, WA (US); Muriel Y. Ishikawa, Livermore, CA (US); Edward K. Y. Jung, Bellevue, WA (US); Jordin T. Kare, Seattle, WA (US); Eric C. Leuthardt, St. Louis, MO (US); Nathan P. Myhrvold, Bellevue, WA (US); Elizabeth A. Sweeney, Seattle, WA (US); Clarence T. Tegreene, Bellevue, WA (US); David B. Tuckerman, Lafayette, CA (US); Thomas A. Weaver, San Mateo, CA (US); Lowell L. Wood, Jr., Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 752 days.

(21) Appl. No.: 12/930,043

(22) Filed: Dec. 22, 2010

(65) Prior Publication Data

US 2011/0276407 A1 Nov. 10, 2011

Related U.S. Application Data

(63) Continuation-in-part of application No. 12/928,703, filed on Dec. 16, 2010, and a continuation-in-part of application No. 12/925,407, filed on Oct. 20, 2010, which is a continuation-in-part of application No. 12/655,808, filed on Jan. 5, 2010, and a continuation-in-part of application No. 12/924,036, filed on Sep. 17, 2010.

(51) Int. Cl.
*G01S 13/00* (2006.01)
*G06Q 30/02* (2012.01)

(52) U.S. Cl.
CPC ............ *G06Q 30/02* (2013.01); *G06Q 30/0269* (2013.01)

(58) Field of Classification Search
USPC ...................................... 342/61, 90, 176, 177
See application file for complete search history.

(56) References Cited

U.S. PATENT DOCUMENTS

| | | |
|---|---|---|
| 3,796,208 A | 3/1974 | Bloice |
| 4,513,748 A | 4/1985 | Nowogrodzki et al. |
| 4,931,865 A | 6/1990 | Scarampi |
| 4,958,638 A | 9/1990 | Sharpe et al. |
| 5,226,425 A | 7/1993 | Righter |
| 5,305,748 A | 4/1994 | Wilk |
| 5,361,070 A | 11/1994 | McEwan |
| 5,448,501 A | 9/1995 | Hablov et al. |

(Continued)

FOREIGN PATENT DOCUMENTS

WO WO 2007/010460 A2 1/2007

OTHER PUBLICATIONS

PCT International Search Report; International App. No. PCT/US 11/00019; Mar. 14, 2011; pp. 1-2.

(Continued)

*Primary Examiner* — Timothy A Brainard
(74) *Attorney, Agent, or Firm* — Dorsey & Whitney LLP

(57) ABSTRACT

One or more micro-impulse radars (MIRs) are configured to determine the movement of at least one person. Media can be output to the person responsive to the movement.

55 Claims, 10 Drawing Sheets

(56) References Cited

U.S. PATENT DOCUMENTS

| | | | |
|---|---|---|---|
| 5,507,291 A | 4/1996 | Stirbl et al. |
| 5,519,400 A | 5/1996 | McEwan |
| 5,573,012 A | 11/1996 | McEwan |
| 5,766,208 A | 6/1998 | McEwan |
| 5,774,091 A | 6/1998 | McEwan |
| 5,850,470 A | 12/1998 | Kung et al. |
| 5,905,436 A | 5/1999 | Dwight et al. |
| 6,011,477 A | 1/2000 | Teodorescu et al. |
| 6,062,216 A | 5/2000 | Corn |
| 6,083,172 A | 7/2000 | Baker, Jr. et al. |
| 6,122,537 A | 9/2000 | Schmidt |
| 6,211,863 B1 | 4/2001 | Chery et al. |
| 6,218,979 B1 | 4/2001 | Barnes et al. |
| 6,289,238 B1 | 9/2001 | Besson et al. |
| 6,292,688 B1 | 9/2001 | Patton |
| 6,315,719 B1 | 11/2001 | Rode et al. |
| 6,351,246 B1 | 2/2002 | McCorkle |
| 6,454,708 B1 | 9/2002 | Ferguson et al. |
| 6,466,125 B1 | 10/2002 | Richards et al. |
| 6,489,893 B1 | 12/2002 | Richards et al. |
| 6,492,906 B1 | 12/2002 | Richards et al. |
| 6,524,239 B1 | 2/2003 | Reed et al. |
| 6,608,910 B1 | 8/2003 | Srinivasa et al. |
| 6,611,206 B2 | 8/2003 | Milanski et al. |
| 6,611,783 B2 | 8/2003 | Kelly, Jr. et al. |
| 6,656,116 B2 | 12/2003 | Kim et al. |
| 6,661,345 B1 | 12/2003 | Bevan et al. |
| 6,696,957 B2 | 2/2004 | Shepher |
| 6,730,023 B1 | 5/2004 | Dodds |
| 6,753,780 B2 | 6/2004 | Li |
| 6,950,022 B2 | 9/2005 | Breed |
| 6,954,145 B2 | 10/2005 | Nakamura et al. |
| 7,001,334 B2 | 2/2006 | Reed et al. |
| 7,106,885 B2 | 9/2006 | Osterweil et al. |
| 7,196,629 B2 | 3/2007 | Ruoss et al. |
| 7,272,431 B2 | 9/2007 | McGrath |
| 7,417,581 B2 | 8/2008 | Fullerton et al. |
| 7,525,434 B2 | 4/2009 | Batra |
| 7,567,200 B1 | 7/2009 | Osterweil |
| 7,692,573 B1 | 4/2010 | Funk |
| 7,916,066 B1 | 3/2011 | Osterweil |
| 8,068,051 B1 * | 11/2011 | Osterweil ........................ 342/28 |
| 8,094,009 B2 | 1/2012 | Allen et al. |
| 8,125,331 B2 | 2/2012 | Allen et al. |
| 8,130,095 B2 | 3/2012 | Allen et al. |
| 8,204,786 B2 | 6/2012 | LeBoeuf et al. |
| 8,284,046 B2 | 10/2012 | Allen et al. |
| 8,284,990 B2 | 10/2012 | Ma et al. |
| 8,311,616 B2 | 11/2012 | Feldman et al. |
| 8,577,446 B2 | 11/2013 | Kyle et al. |
| 2003/0033449 A1 | 2/2003 | Frantz et al. |
| 2003/0058372 A1 | 3/2003 | Williams et al. |
| 2003/0135097 A1 | 7/2003 | Wiederhold et al. |
| 2004/0027270 A1 | 2/2004 | Fullerton et al. |
| 2004/0249257 A1 | 12/2004 | Tupin, Jr. et al. |
| 2004/0249258 A1 | 12/2004 | Tupin, Jr. et al. |
| 2005/0015286 A1 | 1/2005 | Rudnik et al. |
| 2005/0040230 A1 * | 2/2005 | Swartz et al. .................. 235/383 |
| 2005/0046584 A1 | 3/2005 | Breed |
| 2005/0163302 A1 | 7/2005 | Mock et al. |
| 2006/0001545 A1 | 1/2006 | Wolf |
| 2006/0061504 A1 | 3/2006 | Leach, Jr. et al. |
| 2006/0218244 A1 | 9/2006 | Rasmussen et al. |
| 2006/0224051 A1 | 10/2006 | Teller et al. |
| 2006/0239471 A1 | 10/2006 | Mao et al. |
| 2007/0121097 A1 | 5/2007 | Boillot |
| 2007/0136774 A1 | 6/2007 | Lourie et al. |
| 2007/0149282 A1 | 6/2007 | Lu et al. |
| 2007/0214371 A1 | 9/2007 | You et al. |
| 2008/0007445 A1 | 1/2008 | Leach, Jr. et al. |
| 2008/0021401 A1 | 1/2008 | Jacobsen et al. |
| 2008/0028206 A1 | 1/2008 | Sicard et al. |
| 2008/0065468 A1 | 3/2008 | Berg et al. |
| 2008/0077015 A1 | 3/2008 | Borick-Lubecke et al. |
| 2008/0098448 A1 | 4/2008 | Mondesir et al. |
| 2008/0101329 A1 | 5/2008 | Richards et al. |
| 2008/0146892 A1 | 6/2008 | LeBoeuf et al. |
| 2008/0165046 A1 | 7/2008 | Fullerton et al. |
| 2008/0167535 A1 | 7/2008 | Stivoric et al. |
| 2008/0183090 A1 | 7/2008 | Farringdon et al. |
| 2008/0240379 A1 | 10/2008 | Maislos et al. |
| 2008/0270172 A1 * | 10/2008 | Luff et al. ........................ 705/1 |
| 2008/0270238 A1 | 10/2008 | Zweben et al. |
| 2009/0017910 A1 | 1/2009 | Rofougaran et al. |
| 2009/0025024 A1 | 1/2009 | Beser et al. |
| 2009/0052859 A1 | 2/2009 | Greenberger et al. |
| 2009/0138805 A1 | 5/2009 | Hildreth |
| 2009/0140851 A1 | 6/2009 | Graves et al. |
| 2009/0164287 A1 | 6/2009 | Kies et al. |
| 2009/0284378 A1 | 11/2009 | Ferren et al. |
| 2009/0296997 A1 | 12/2009 | Rocheford |
| 2009/0328089 A1 | 12/2009 | Pradeep et al. |
| 2010/0106475 A1 | 4/2010 | Smith et al. |
| 2010/0117837 A1 | 5/2010 | Stirling et al. |
| 2010/0234714 A1 | 9/2010 | Mercier et al. |
| 2010/0234720 A1 | 9/2010 | Tupin, Jr. et al. |
| 2010/0241313 A1 | 9/2010 | Fiske et al. |
| 2010/0259395 A1 | 10/2010 | Nuthi |
| 2010/0306388 A1 | 12/2010 | Newville |
| 2011/0080529 A1 | 4/2011 | Wong |
| 2011/0109545 A1 | 5/2011 | Touma et al. |
| 2011/0161136 A1 * | 6/2011 | Faith et al. ................... 705/7.29 |
| 2011/0307210 A1 * | 12/2011 | Stevens et al. ................ 702/150 |
| 2012/0116186 A1 | 5/2012 | Shrivastav et al. |
| 2012/0286955 A1 | 11/2012 | Welch et al. |
| 2012/0326873 A1 | 12/2012 | Utter, II |

OTHER PUBLICATIONS

Michahelles et al.; "Less Contact: Heart-rate detection without even touching the user"; Proceedings of the Eighth International Symposium on Wearable Computers; 2004; vol. 1; pp. 1-4; Retrieved from URL: http://ieeexplore.ieee.org/stamp/stamp.jsp?tp=&arnumber=1364682&isnumber=29895 printed on Dec. 26, 2011; IEEE.

PCT International Search Report; International App. No. PCT/ US 11/01629; Jan. 9, 2012; pp. 1-3.

Azevedo et al.; "Micropower Impulse Radar"; Science and Technology Review; Jan./Feb. 1996; Retrieved from the internet on Feb. 10, 2012 (as provided by Officer); pp. 16-29; located at: https://www.llnl.gov/str/pdfs/01_96.2.pdf.

PCT International Search Report; International App. No. PCT US2011/001985; May 2, 2012; pp. 1-5.

Tivive et al.; "A Human Gait Classification Method Based on Radar Doppler Spectrograms"; EURASIP Journal on Advances in Signal Processing; Bearing a date of Feb. 1, 2010; pp. 1-12; vol. 2010; Hindawi Publishing Corporation.

Warren et al.; "Designing Smart Health Care Technology into the Home of the Future"; Sandia National Laboratories; Mar. 25, 1999; pp. 1-18.

Zhang, Zhaonian; "A Micro-Doppler Sonar for Acoustic Surveillance in Sensor Networks"; ProQuest Dissertations and Theses: The Science and Engineering Collection; bearing a date of Aug. 2008; 224 pgs.; ProQuest, LLC.

PCT International Search Report; International App. No. PCT/US11/00018; Mar. 4, 2011; pp. 1-2.

PCT International Search Report; International App. No. PCT/ US2011/001790; Feb. 3, 2012; pp. 1-2.

PCT International Search Report; International App. No. PCT/US 11/01789; Feb. 14, 2012; pp. 1-2.

European Patent Office, Supplementary European Search Report, Pursuant to Rule 62 EPC; App. No. 11834761.6; Apr. 7, 2014; pp. 1-6.

Extended European Search Report; European App. No. EP 11 73 2004; Oct. 7, 2014; pp. 1-6.

* cited by examiner

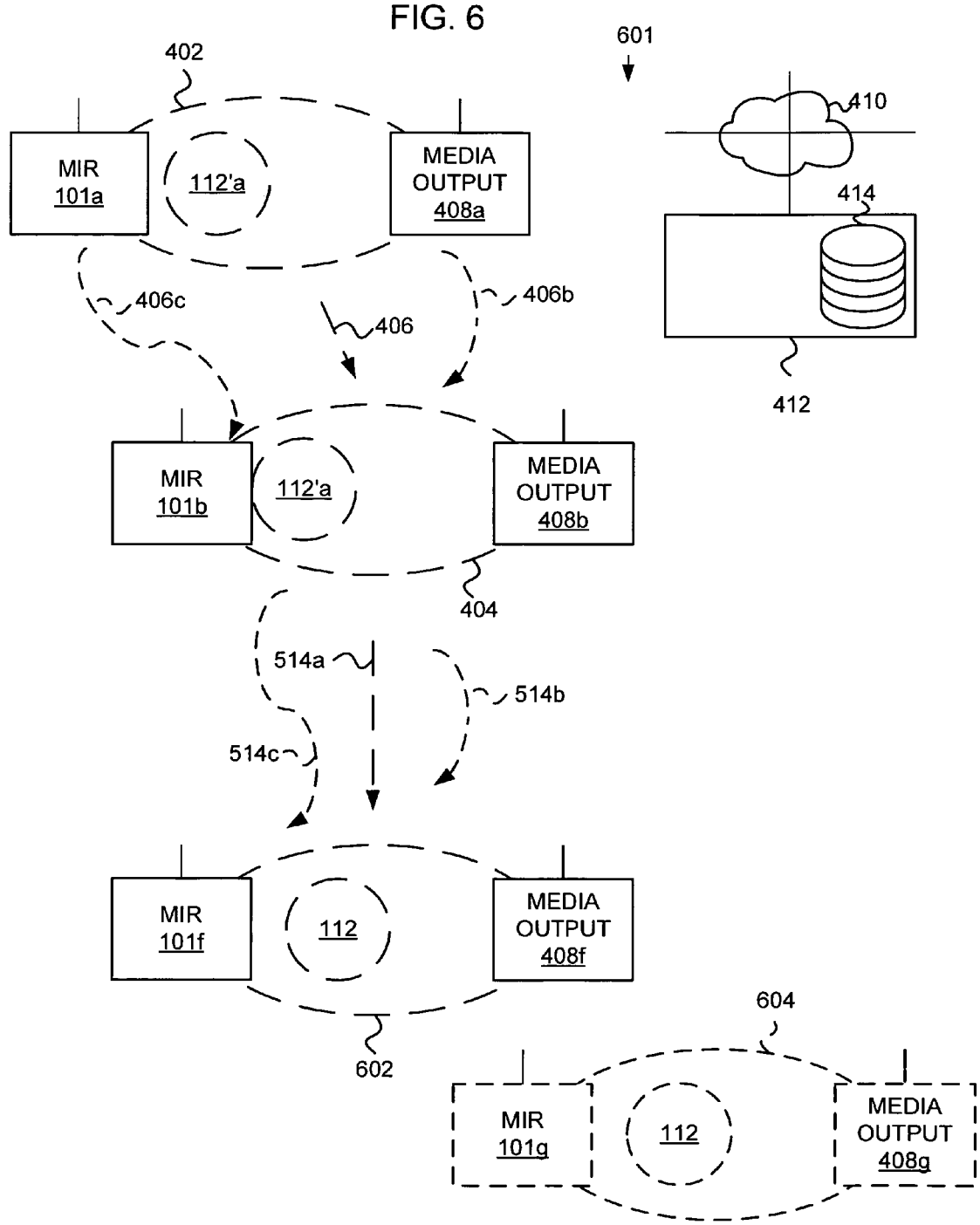

METHOD AND APPARATUS FOR MEASURING THE MOTION OF A PERSON

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of the following United States Patent Applications:

Application Ser. No. 12/928,703, entitled TRACKING IDENTITIES OF PERSONS USING MICRO-IMPULSE RADAR, naming Mahalaxmi Gita Bangera, Roderick A. Hyde, Muriel Y. Ishikawa, Edward K. Y. Jung, Jordin T. Kare, Eric C. Leuthardt, Nathan P. Myhrvold, Elizabeth A. Sweeney, Clarence T. Tegreene, David B. Tuckerman, Lowell L. Wood, Jr., and Victoria Y. H. Wood as inventors, filed on Dec. 16, 2010, which is currently co-pending, or is an application of which a currently co-pending application is entitled to the benefit of the filing date;

Application Ser. No. 12/925,407, entitled MEDIA OUTPUT WITH MICRO-IMPULSE RADAR FEEDBACK OF PHYSIOLOGICAL RESPONSE, naming Mahalaxmi Gita Bangera, Roderick A. Hyde, Muriel Y. Ishikawa, Edward K. Y. Jung, Jordin T. Kare, Eric C. Leuthardt, Nathan P. Myhrvold, Elizabeth A. Sweeney, Clarence T. Tegreene, David B. Tuckerman, Lowell L. Wood, Jr., and Victoria Y. H. Wood as inventors, filed on Oct. 20, 2010, which is currently co-pending, or is an application of which a currently co-pending application is entitled to the benefit of the filing date;

Application Ser. No. 12/924,036, entitled MICRO-IMPULSE RADAR DETECTION OF A HUMAN DEMOGRAPHIC AND DELIVERY OF TARGETED MEDIA CONTENT, naming Mahalaxmi Gita Bangera, Roderick A. Hyde, Muriel Y. Ishikawa, Edward K. Y. Jung, Jordin T. Kare, Eric C. Leuthardt, Nathan P. Myhrvold, Elizabeth A. Sweeney, Clarence T. Tegreene, David B. Tuckerman, Lowell L. Wood, Jr., and Victoria Y. H. Wood as inventors, filed on Sep. 17, 2010, which is currently co-pending, or is an application of which a currently co-pending application is entitled to the benefit of the filing date; and Application Ser. No. 12/655,808, entitled CONTROL OF AN ELECTRONIC APPARATUS USING MICRO-IMPULSE RADAR, naming Mahalaxmi Gita Bangera, Roderick A. Hyde, Muriel Y. Ishikawa, Edward K. Y. Jung, Jordin T. Kare, Eric C. Leuthardt, Nathan P. Myhrvold, Elizabeth A. Sweeney, Clarence T. Tegreene, David B. Tuckerman, Lowell L. Wood, Jr., and Victoria Y. H. Wood as inventors, filed on Jan. 5, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a system for tracking a path of a person includes a plurality of micro-impulse radars (MIRs) configured to probe a respective plurality of regions and a computing resource operatively coupled to the plurality of MIRs. The computing resource is configured to receive signals or data from at least a portion of the plurality of MIRs, correlate the signals or data to at least one phenotypic identity or at least one individual identity, and infer or determine a path or a path characteristic between the regions of at least one person corresponding to the at least one phenotypic identity or individual identity.

According to an embodiment, a method for tracking the movement of a person includes extracting a new (second) human phenotypic identity from a MIR signal from a (second) region. The second phenotypic identity is compared to one or more first phenotypic identities extracted from at least one MIR signal from at least one first region, and the second phenotypic identity is correlated to at least one of the one or more first phenotypic identities to determine movement between regions by a person corresponding to the second phenotypic identity.

According to an embodiment, a system for tracking the movement of persons includes a plurality of MIRs configured to probe respective regions. At least one processor is operatively coupled to the plurality of MIRs and configured to perform signal analysis to determine at least one phenotypic profile corresponding to a person. An electronic controller is configured to receive the phenotypic profile from the processor, associate the phenotypic profile to one or more previously received phenotypic profiles, and correlate the associated phenotypic profiles to time or locations of respective probed regions.

According to an embodiment, an apparatus includes a MIR configured to detect a speed or velocity associated with a person and a controller operatively configured to select media content for display to the person responsive to the velocity or speed.

According to an embodiment, a method includes operating a MIR to detect a speed or velocity associated with a person selecting media content for display to the person responsive to the velocity or speed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6 is a diagram of a system for tracking the motion of a person including previous and current paths, and possible future destinations, according to an embodiment.

DETAILED DESCRIPTION

Figure 1:
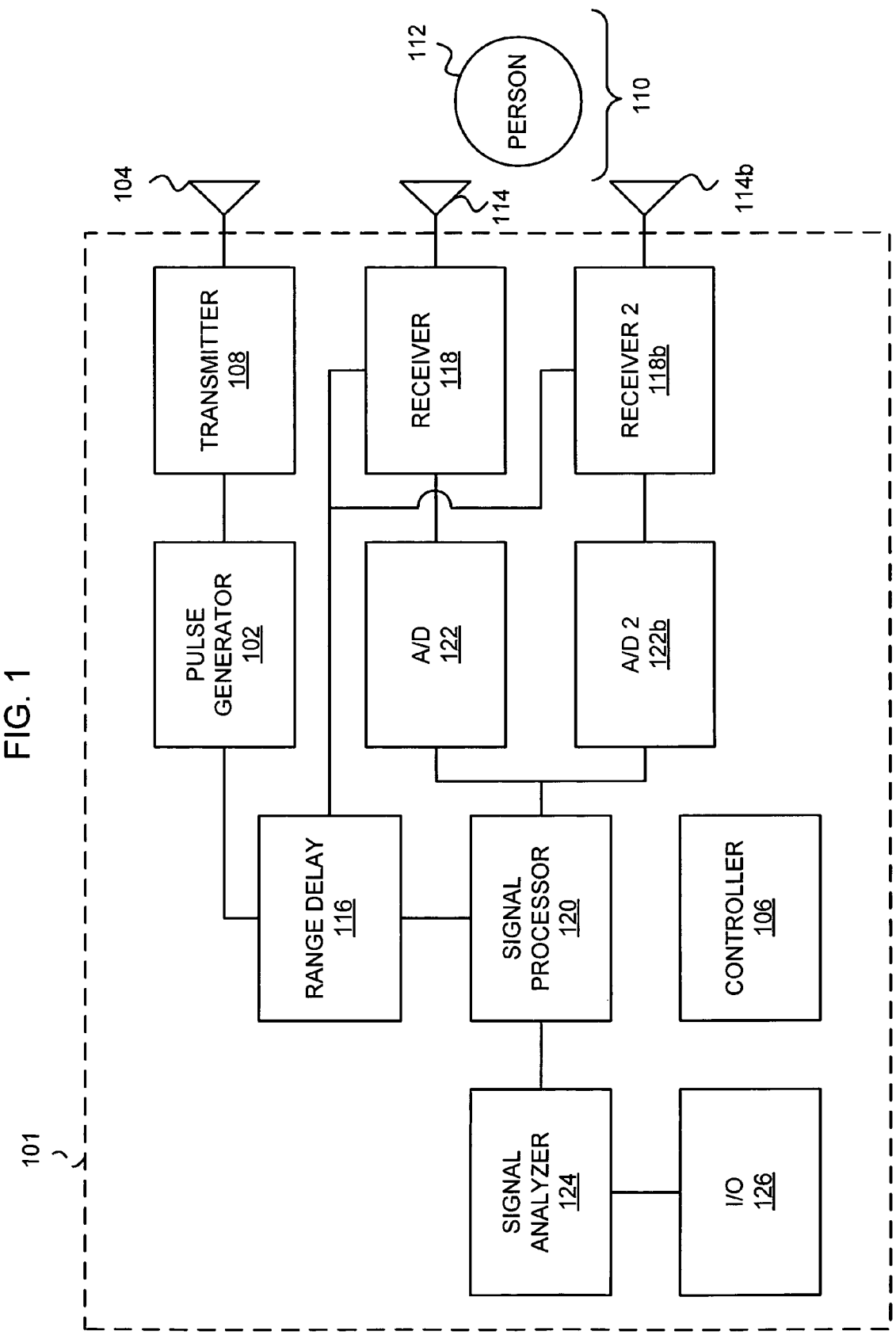
FIG. 1 is a simplified block diagram of a micro-impulse radar (MIR), according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here.

FIG. 1 is a simplified block diagram of a micro-impulse radar (MIR) 101, according to an embodiment. A pulse generator 102 is configured to output a relatively short voltage pulse that is applied to a transmit antenna 104. A typical transmitted pulse width can be between about two hundred picoseconds and about 5 nanoseconds, for example. The voltage pulse can be conditioned and amplified (or attenuated) for output by a transmitter 108. For example, the transmitter 108 can transmit the voltage pulse or can further condition the pulse, such as by differentiating a leading and/or trailing edge to produce a short sub-nanosecond transmitted pulse. The voltage pulse is typically not modulated onto a carrier frequency. Rather the voltage pulse transmission spectrum is the frequency domain transform of the emitted pulse. The MIR 101 can probe a region 110 by emitting a series of spaced voltage pulses. For example the series of voltage pulses can be spaced between about 100 nanoseconds and 100 microseconds apart. Typically, the pulse generator 102 emits the voltage pulses with non-uniform spacing such as random or pseudo-random spacing, although constant spacing can be used if interference or compliance is not a concern. Spacing between the series of voltage pulses can be varied responsive to detection of one or more persons 112 in the region 110. For example, the spacing between pulses can be relatively large when a person 112 is not detected in the region 110. Spacing between pulses can be decreased (responsive to one or more commands from a controller 106) when a person 112 is detected in the region 110. For example, the decreased time between pulses can result in faster MIR data generation for purposes of more quickly determining information about one or more persons 112 in the region 110. The emitted series of voltage pulses can be characterized by spectral components having high penetration that can pass through a range of materials and geometries in the region 110.

An object 112 (such as a person) in the probed region 110 can selectively reflect, refract, absorb, and/or otherwise scatter the emitted pulses. A return signal including a reflected, refracted, absorbed, and/or otherwise scattered signal can be received by a receive antenna 114. Optionally, the receive antenna 114 and transmit antenna 104 can be combined into a single antenna. In a single antenna embodiment, a filter (not shown) can be used to separate the return signal from the emitted pulse.

A probed region 110 can be defined according to an angular extent and distance from the transmit antenna 104 and the receive antenna 114. Distance can be determined by a range delay 116 configured to trigger a receiver 118 operatively coupled to the receive antenna 114. For example the receiver 118 can include a voltage detector such as a capture-and-hold capacitor or network. The range delay corresponds to distance into the region 110. Range delay can be modulated to capture information corresponding to different distances.

A signal processor 120 can be configured to receive detection signals or data from the receiver 118 and the analog to digital converter 122, and by correlating range delay to the detection signal, extract data corresponding to the probed region 110 including the object 112.

Optionally, the MIR 101 can include a second receive antenna 114b. The second receive antenna can be operatively coupled to a second receiver 118b coupled to an output of the range delay 116 or a separate range delay (not shown) configured to provide a delay selected for a depth into the region 110. The signal processor 120 can further receive output from a second A/D converter 122b operatively coupled to the second receiver 118b.

The signal processor 120 can be configured to compare detection signals received by the antennas 114, 114b. For example, the signal processor 120 can search for common signal characteristics such as similar reflected static signal strength or spectrum, similar (or corresponding) Doppler shift, and/or common periodic motion components, and compare the respective range delays corresponding to detection by the respective antennas 114, 114b. Signals sharing one or more characteristics can be correlated to triangulate to a location of one or more objects 112 in the region 110 relative to known locations of the antennas 114, 114b. The triangulated locations can be output as computed ranges of angle or computed ranges of extent.

For example, a first signal corresponding to a reflected pulse received by an antenna element 114 can be digitized by an analog-to-digital converter (A/D) 122 to form a first digitized waveform. A second signal corresponding to the reflected pulse received by a second antenna element 114*b* can similarly be digitized by and A/D 122*b* (or alternatively by the same A/D converter 122) to form a second digitized waveform. The signal processor 120 can compare the first and second digitized waveforms and deduce angular information from the first and second digitized waveforms and known geometry of the first and second antenna elements.

A second pulse can be received at a second range delay 116 value and can be similarly signal processed to produce a second set of angular information that maps a second surface at a different distance. Depth within a given range delay can be inferred from a strength of the reflected signal. A greater number of signals can be combined to provide additional depth information. A series of pulses can be combined to form a time series of signals corresponding to the object 112 that includes movement information of the object 112 through the region 110. The object 112 described herein can include one or more persons.

The signal processor 120 outputs MIR data. The MIR data can include object location information, object shape information, object velocity information, information about inclusion of high density and/or conductive objects such as jewelry, cell phones, glasses including metal, etc., and physiological information related to periodic motion. The MIR data can include spatial information, time-domain motion information, and/or frequency domain information. Optionally, the MIR data can be output in the form of an image. MIR data in the form of an image can include a surface slice made of pixels or a volume made of voxels. Optionally, the image can include vector information.

The MIR data from the signal processor 120 is output to a signal analyzer 124. The signal analyzer 124 can be integrated with the signal processor 120 and/or can be included in the same MIR 101, as shown. Alternatively, the signal processor 120 can output MIR data through an interface to a signal analyzer 124 included in an apparatus separate from the MIR 101.

A signal analyzer 124 can be configured to extract desired information from MIR data received from the signal processor 120. Data corresponding to the extracted information can be saved in a memory for access by a data interface 126 or can be pushed out the data interface 126.

The signal analyzer 124 can be configured to determine the presence of a person 112 in the region 110. For example MIR data from the signal processor can include data having a static spectrum at a location in the region 110, and a periodic motion spectrum corresponding to the location characteristic of a human physiological process (e.g. heartbeat and/or breathing). From the correspondence of such MIR data, it can be deduced that a person 112 is at the location in the region 110. The signal analyzer 124 can be configured to determine a number of persons 112 in the region 110. The signal analyzer 124 can be configured to determine the size of a person and/or relative size of anatomical features of a person 112 in the region 110. The signal analyzer 124 can be configured to determine the presence of an animal 112 in the region 110. The signal analyzer 124 can be configured to determine movement and/or speed of movement of a person 112 through the region 110. The signal analyzer 124 can be configured to determine or infer the orientation of a person 112 such as the direction a person is facing relative to the region 110. The signal analyzer 124 can be configured to determine one or more physiological aspects of a person 112 in the region 110. The signal analyzer 124 can determine presence of a personal appliance such as a cell phone, PDA, etc. and/or presence of metalized objects such as credit cards, smart cards, access cards, etc. The signal analyzer 124 can determine the presence of an associated article such as a carts or hand truck, a baby strollers, a bicycle, wheeled luggage, a wheel chair, a walker, crutches, a cane, or other object that can be carried, pushed, pulled, or ridden by the person 112. The signal analyzer 124 can infer the gender and age of one or more persons based on returned MIR data. For example, male bodies can generally be characterized by higher mass density than female bodies, and thus can be characterized by somewhat greater reflectivity at a given range. Adult female bodies can exhibit relatively greater harmonic motion ("jiggle") responsive to movements, and can thus be correlated to harmonic spectra characteristics. Older persons generally move differently than younger persons, allowing an age inference based on detected movement in the region 110.

By determination of one or more such aspects and/or combinations of aspects, the signal analyzer 124 can determine a demographic of one or more persons 112 in the region 110.

For example, MIR data can include movement corresponding to the beating heart of one or more persons 112 in the region 110. The signal analyzer 124 can filter the MIR data to remove information not corresponding to a range of heart rates, and determine one or more heart rates by comparing movement of the heart surface to the MIR signal rate. The one or more heart rates can further be characterized according to a confidence factor, depending on statistical certainty regarding the determined one or more heart rates.

Similarly, the signal analyzer 124 can determine one or more respiration rates by measuring movement corresponding to the chest or diaphragm of one or more persons 112. The signal analyzer 124 can determine movement, a direction of movement, and/or a rate of movement of one or more persons 112 in the region 110. Operation of the signal analyzer 124 is described in greater detail below by reference to FIGS. 2 and 3.

An electronic controller 106 can be operatively coupled to the pulse generator 102, the transmitter 108, the range delay 116, the receiver 118, the analog-to-digital converter 122, the signal processor 120, and/or the signal analyzer 124 to control the operation of the components of the MIR 101. For embodiments so equipped, the electronic controller 106 can also be operatively coupled to the second receiver 118*b*, and the second analog-to-digital converter 122*b*. The data interface 126 can include a high speed interface configured to output data from the signal analyzer 124. Alternatively, for cases where signals are analyzed externally to the MIR, the data interface 126 can include a high speed interface configured to output MIR data from the signal processor 120. The data interface 126 can include an interface to the controller 106. Optionally, the controller 106 can be interfaced to external systems via a separate interface (not shown).

Figure 2:
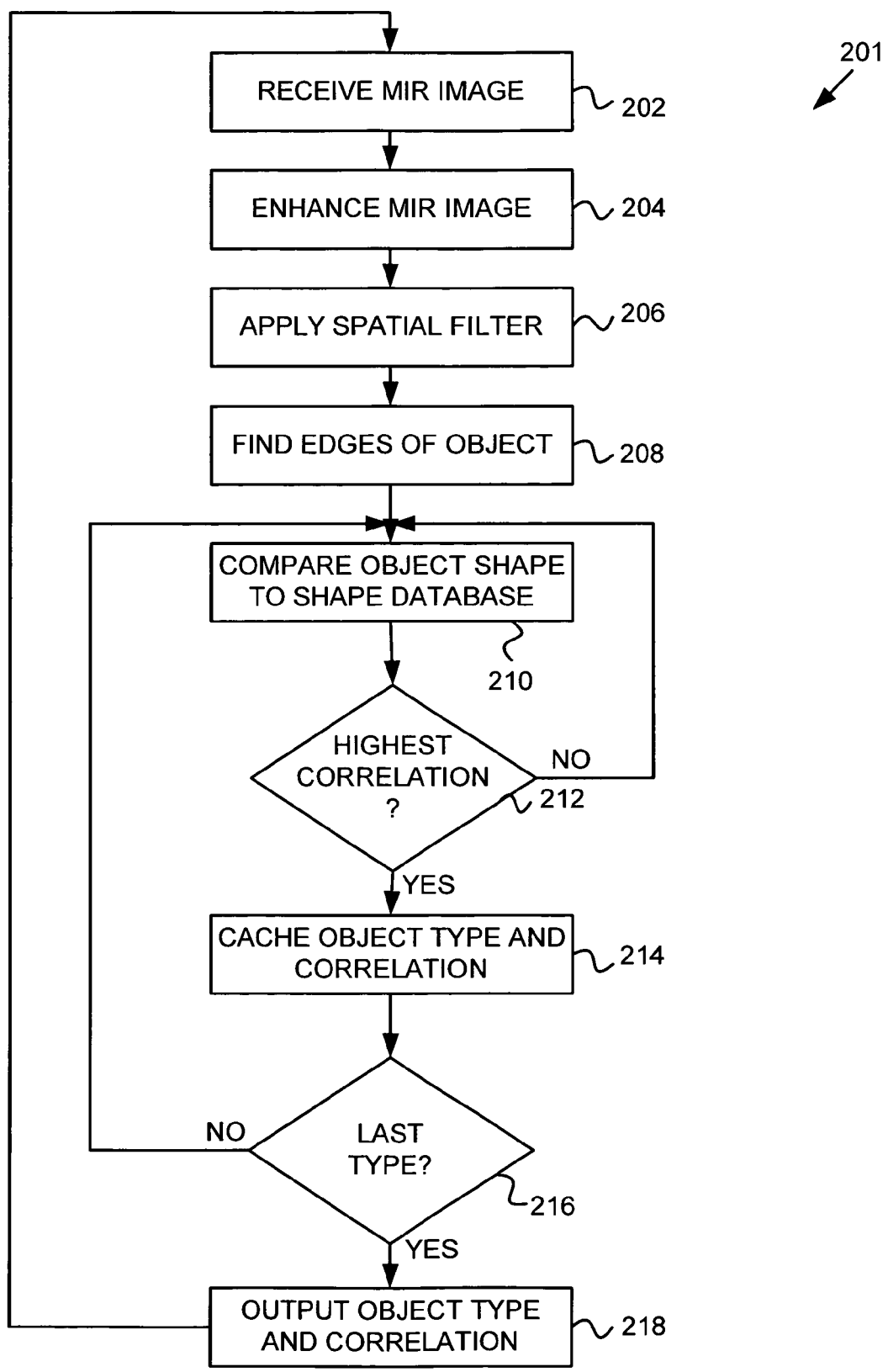
FIG. 2 is a flow chart showing an illustrative process for determining the presence of a person in a region with the MIR of FIG. 1, according to an embodiment.

FIG. 2 is a flow chart showing an illustrative process 201 for determining the presence of one or more persons 112 in the region 110 with the signal analyzer 124 of the MIR 101, according to an embodiment. Beginning with step 202, MIR data is received as described above in conjunction with FIG. 1. The MIR data can correspond to a plurality of probes of the region 110. Proceeding to optional step 204, the MIR data can be enhanced to facilitate processing. For example, grayscale data corresponding to static reflection strength as a function of triangulated position can be adjusted, compressed, quantized, and/or expanded to meet a desired average signal brightness and range. Additionally or alternatively, velocity information corresponding to Doppler shift, and/or frequency transform information corresponding to periodically varying velocity can similarly be adjusted, compressed, quantized, and/or expanded. Systematic, large scale variations in brightness can be balanced, such as to account for side-to-side variations in antenna coupling to the region. Contrast can be enhanced such as to amplify reflectance variations in the region.

Proceeding to optional step 206, a spatial filter can be applied. Application of a spatial filter can reduce processing time and/or capacity requirements for subsequent steps described below. The spatial filter may, for example, include a computed angle or computed extent filter configured to remove information corresponding to areas of contrast, velocity, or frequency component(s) having insufficient physical extent to be large enough to be an object of interest. The spatial filter may, for example, identify portions of the region 110 having sufficient physical extent to correspond to body parts or an entire body of a person 112, and remove features corresponding to smaller objects such as small animals, leaves of plants, or other clutter. According to an embodiment, the spatial filter can remove information corresponding to areas of contrast, velocity, or frequency component(s) having physical extent greater than a maximum angle or extent that is likely to correspond to a person or persons 112. In other embodiments, the spatial filter applied in step 206 can eliminate small, low contrast features, but retain small, high contrast features such as jewelry, since such body ornamentation can be useful in some subsequent processes. The step of applying the spatial filter 206 can further include removing background features from the MIR data. For example, a wall lying between an antenna 104, 114 and the region 110 can cast a shadow such as a line in every MIR signal. Removal of such constant features can reduce subsequent processing requirements.

Proceeding to optional step 208, an edge-finder can identify edges of objects 112 in the region 110. For example, a global threshold, local threshold, second derivative, or other algorithm can identify edge candidates. Object edges can be used, for example, to identify object shapes, and thus relieve subsequent processes from operating on grayscale data. Alternatively, step 208 can be omitted and the process of identifying objects can be performed on the grayscale MIR data.

Proceeding to step 210, processed data corresponding to the MIR data is compared to a database to determine a match. The object data received from step 202 (and optionally steps 204, 206, and/or 208) can be compared to corresponding data for known objects in a shape database. Step 210 can be performed on a grayscale signal, but for simplicity of description it will be assumed that optional step 208 was performed and matching is performed using object edges, velocity, and/or spectrum values. For example, the edge of an object 112 in the region 110 can include a line corresponding to the outline of the head and torso, cardiac spectrum, and movements characteristic of a young adult male. A first shape in the shape database can include the outline of the head and torso, cardiac spectrum, density, and movements characteristic of a young adult female and/or the head and torso outline, cardiac spectrum, density, and movements characteristic of a generic human. The differences between the MIR data and the shape database shape can be measured and characterized to derive a probability value. For example, a least-squares difference can be calculated.

Optionally, the object shape from the MIR data can be stepped across, magnified, and stepped up and down the shape database data to minimize a sum-of-squares difference between the MIR shape and the first shape in the shape database. The minimum difference corresponds to the probability value for the first shape.

Proceeding to step 212, if the probability value for the first shape is the best probability yet encountered, the process proceeds to step 214. For the first shape tested, the first probability value is the best probability yet encountered. If an earlier tested shape had a higher probability to the MIR data, the process loops back from step 212 to step 210 and the fit comparison is repeated for the next shape from the shape database.

In step 214, the object type for the compared shape from the shape database and the best probability value for the compared shape are temporarily stored for future comparison and/or output. For example, the compared shape from the shape database can be identified by metadata that is included in the database or embedded in the comparison data. Proceeding to step 216, the process either loops back to step 210 or proceeds to step 218, depending on whether a test is met. If the most recently compared shape is the last shape available for comparison, then the process proceeds to step 218.

Optionally, if the most recently compared shape is the last shape that the process has time to compare (for example, if a new MIR data is received and/or if another process requires output data from the process 201) then the process proceeds to step 218. In step 218, the object type and the probability value is output. The process can then loop back to step 202 and the process 201 can be repeated.

Otherwise, the process 201 loops from step 216 back to step 210. Again, in step 210, the next comparison shape from a shape database is loaded. According to an embodiment, the comparison can proceed from the last tested shape in the shape database. In this way, if the step 218 to 202 loop occurs more rapidly than all objects in the shape database can be compared, the process eventually works its way through the entire shape database. According to an embodiment, the shape database can include multiple copies of the same object at different orientations, distances, and positions within the region. This can be useful to reduce processing associated with stepping the MIR shape across the shape database shape and/or changing magnification.

The object type can include determination of a number of persons 112 in the region 110. For example, the shape database can include outlines, cardiac and/or respiration spectra, density, and movement characteristics for plural numbers of persons. According to embodiments, the shape library can include shapes not corresponding to persons. This can aid in identification of circumstances where no person 212 is in the region 210. Optionally, process 201 can be performed using plural video frames such as averaged video frames or a series of video frames. Optionally, steps 212, 214, and 216 can be replaced by a single decision step that compares the probability to a predetermined value and proceeds to step 218 if the probability meets the predetermined value. This can be useful, for example, in embodiments where simple presence or absence of a person 212 in the region 210 is sufficient information.

According to an embodiment, the signal analysis process 201 of FIG. 2 can be performed using conventional software running on a general-purpose microprocessor. Optionally, the process 201 can use various combinations of hardware, firmware, and software; and can include the use of a digital signal processor.

Figure 3:
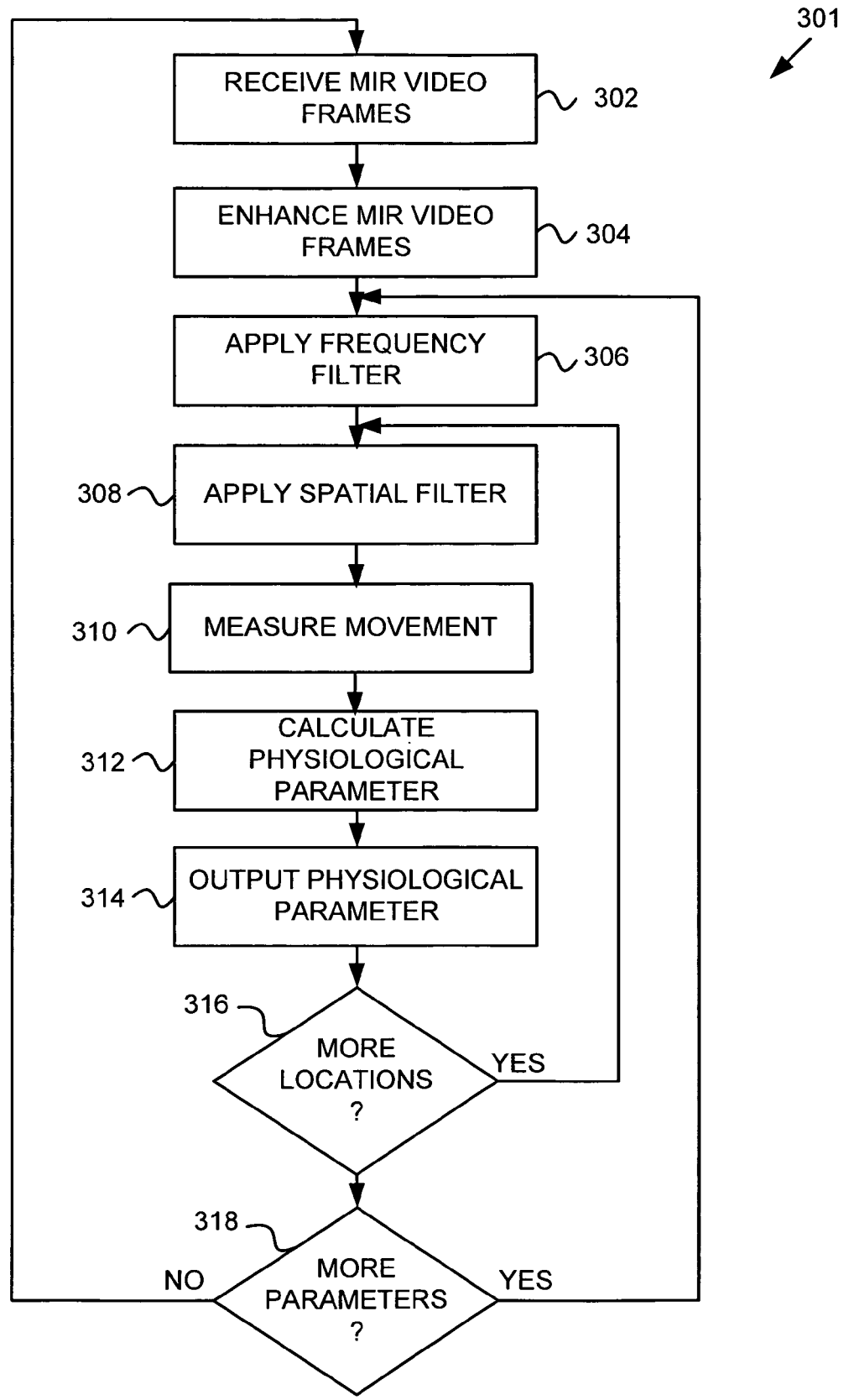
FIG. 3 is a flow chart showing an illustrative process for determining a physiological parameter of a person in a region with the MIR of FIG. 1, according to an embodiment.

FIG. 3 is a flow chart showing an illustrative process 301 for determining one or more particular physiological parameters of a person 112 in the region 110 with the signal analyzer 124 of the MIR 101, according to an embodiment. Optionally, the process 301 of FIG. 3 can be performed conditional to the results of another process such as the process 201 of FIG. 2. For example, if the process 201 determines that no person 112 is in the region 110, then it can be preferable to continue to repeat process 201 rather than execute process 301 in an attempt to extract one or more particular physiological parameters from a person that is not present.

Beginning with step 302, a series of MIR time series data is received. While the received time series data need not be purely sequential, the process 301 generally needs the time series data received in step 302 to have a temporal capture relationship appropriate for extracting time-based information. According to an embodiment, the MIR time series data can have a frame rate between about 16 frames per second and about 120 frames per second. Higher capture rate systems can benefit from depopulating frames, such as by dropping every other frame, to reduce data processing capacity requirements.

Proceeding to step 304, the MIR video frames can be enhanced in a manner akin to that described in conjunction with step 204 of FIG. 2. Optionally, step 304 can include averaging and/or smoothing across multiple MIR time series data. Proceeding to optional step 306, a frequency filter can be applied. The frequency filter can operate by comparing changes between MIR time series data to a reference frequency band for extracting a desired physical parameter. For example, if a desired physiological parameter is a heart rate, then it can be useful to apply a pass band for periodic movements having a frequency between about 20 cycles per minute and about 200 cycles per minute, since periodic motion beyond those limits is unlikely to be related to a human heart rate. Alternatively, step 304 can include a high pass filter that removes periodic motion below a predetermined limit, but retains higher frequency information that can be useful for determining atypical physiological parameters.

Proceeding to optional step 308, a spatial filter can be applied. The spatial filter may, for example, include a pass band filter configured to remove information corresponding to areas of contrast having insufficient physical extent to be large enough to be an object of interest, and remove information corresponding to areas too large to be an object of interest. The spatial filter may, for example, identify portions of the region 110 having sufficient physical extent to correspond to the heart, diaphragm, or chest of a person 112, and remove signal features corresponding to smaller or larger objects. The step of applying the spatial filter 308 can further include removing background features from the MIR data. For example, a wall lying between an antenna 104, 114 (114b) and the region 110 can cast a shadow such as a line in every instance of MIR data. Removal of such constant features can reduce subsequent processing requirements.

Proceeding to step 310, movement such as periodic movement in the MIR time series data is measured. For example, when a periodic motion is to be measured, a time-to-frequency domain transform can be performed on selected signal elements. For example, when a non-periodic motion such as translation or rotation is to be measured, a rate of movement of selected signal elements can be determined. Optionally, periodic and/or non-periodic motion can be measured in space vs. time. Arrhythmic movement features can be measured as spread in frequency domain bright points or can be determined as motion vs. time. Optionally, subsets of the selected signal elements can be analyzed for arrhythmic features. Optionally, plural subsets of selected signal elements can be cross-correlated for periodic and/or arrhythmic features. Optionally, one or more motion phase relationships between plural subsets of selected signal features, between a subset of a selected signal feature and the signal feature, or between signal features can be determined.

For example, a person with a hiccup can be detected as a non-periodic or arrhythmic motion superimposed over periodic motion of a signal element corresponding to the diaphragm of the person.

Proceeding to step 312, a physiological parameter can be calculated. For example, MIR data can include data having a periodic motion spectrum corresponding to the location characteristic of a human physiological process (e.g. heartbeat and/or breathing). Step 312 can include determining one or more heart rates by comparing movement of the heart surface to the MIR signal rate. The one or more heart rates can further be characterized according to a confidence factor, depending on statistical certainty regarding the determined one or more heart rates. Similarly, step 312 can include determining one or more respiration rates by measuring movement corresponding to the chest or diaphragm of one or more persons.

Proceeding to step 314, the physiological parameter can be output. Proceeding to step 316, if there are more locations to measure, the process 301 can loop back to execute step 308. If there are not more locations to measure, the process can proceed to step 318. In step 318, if there are more physiological parameters to measure, the process 301 can loop back to execute step 306. If there are not more physiological parameters to measure, the process 301 can loop back to step 302, and the process 301 of FIG. 3 can be repeated.

Figure 4:
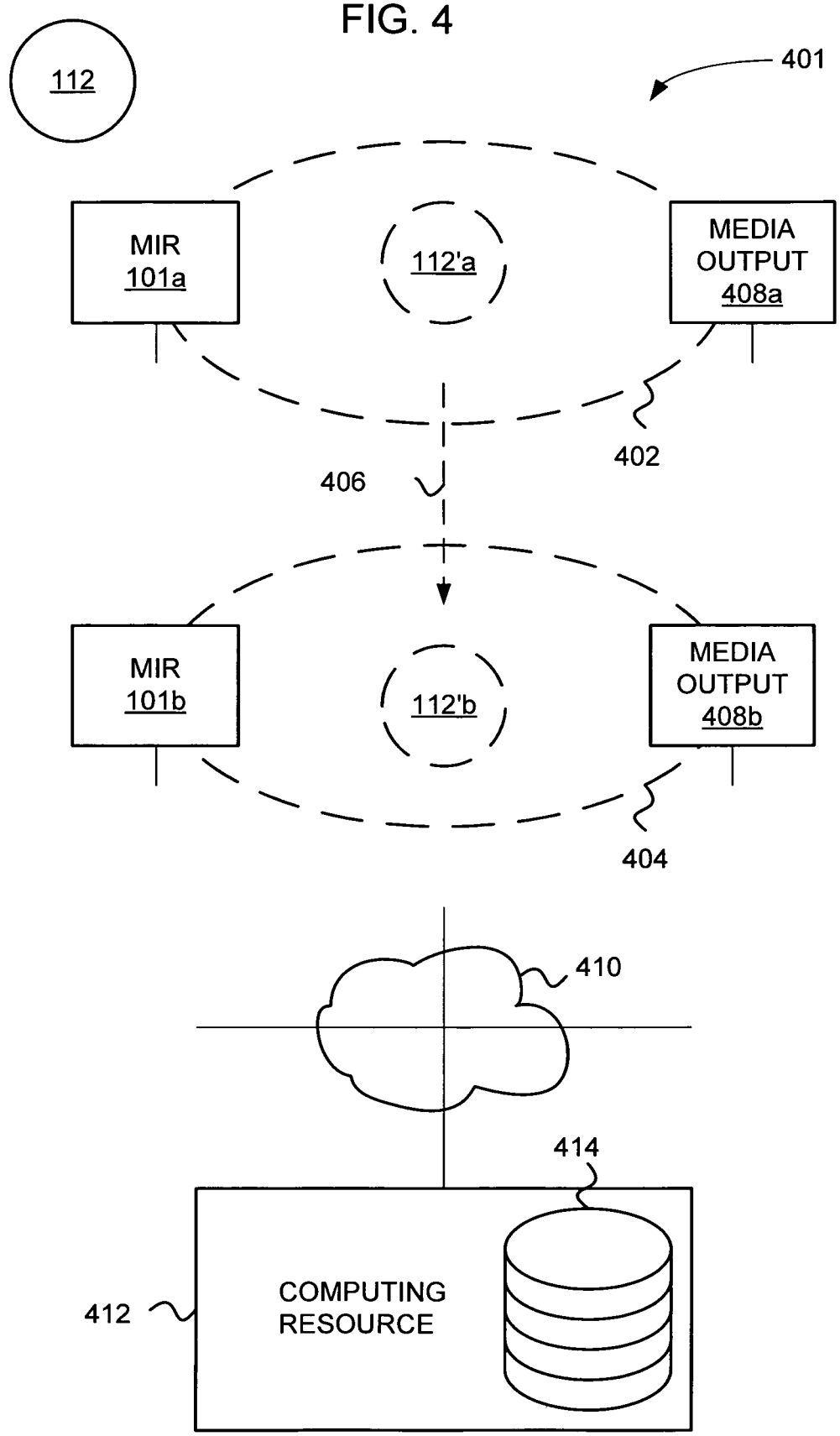
FIG. 4 is a diagram of a system for tracking the motion of persons using MIRs, according to an embodiment.

FIG. 4 is a diagram of a system 401 for tracking the motion of a person 112, according to an embodiment. The system 401 includes plurality of MIRs 101a, 101b configured to probe a respective plurality of regions 402, 404. A computing resource 412, optionally including a non-transient computer-readable medium 414, is operatively coupled to the plurality of MIRs 101a, 101b, for example via a computer network 410. The computing resource 412 is configured to receive signals or data from at least a portion of the plurality of MIRs 101a, 101b. For example, the plurality of MIRs can provide MIR signals or data including information corresponding to human attributes, or the plurality of MIRs can perform processing to convert the information corresponding to human attributes into phenotypic profiles including the attributes. The computing resource 412 can be configured to correlate the signals or data from the MIRs to at least one phenotypic identity 112' and/or at least one individual identity corresponding to the person 112.

The computing resource 412 can be further configured to infer or determine a travel path or a path characteristic 406 between the regions 402, 404 taken by the at least one person 112 corresponding to the at least one phenotypic identity 112' or individual identity. For example, the computing resource 412 can determine that a first phenotypic identity 112'a sensed by a first MIR 101a in a first region 402 at a first time corresponds to the same person 112 as a second phenotypic identity 112'b sensed by a second MIR 101b in a second region 404 at a second time. From the two observed times and locations 402, 404, the computing resource 412 can infer that the person 112 traveled along a path 406 between the two regions. Similarly, the computing resource 412 can also infer or determine paths taken by persons between a larger plurality of regions, as described more fully in conjunction with FIG. 6, below.

The system 401 can also include media output apparatuses 408 operatively coupled to the computing resource 412. For example, the system 401 can include media output apparatuses 408a, 408b respectively configured to output media to the regions 402, 404 and at least one person 112 in the regions. For example, the media output apparatuses 408a, 408b can include one or more of a portable media player, an electronic display, configurable signage, a video screen, or a loudspeaker.

The computing resource 412 can be further configured to select at least one media parameter for a media output apparatus 408b responsive to the inferred or determined path or path characteristic 406. For example, the computing resource 412 can be configured to select a media source (not shown) or transmit media corresponding to the at least one media parameter to the media output apparatus 408b. The computing resource 412 can also be configured to operate the media output apparatus 408b according to the at least one media parameter. In the case of a portable media player, the computing resource 412 can cause a personal media player 408 carried by the person 112 to output media to the person corresponding to the parameter.

For example, the at least one media parameter can include a configuration corresponding to an instance of a presence of the at least one person 112 in a previously visited region 402. The at least one media parameter can include time synchronization of a media file or media stream with the media file or media stream output to the person 112 in the previously visited region 402. This can provide, for example, substantially uninterrupted receipt of a media file or stream across a plurality of media output devices 408a, 408b, etc. as the person 112 travels between regions 402, 404, etc. into which the media output devices deliver the media. Similarly, the computing resource 412 can select media parameters including one or more of an advertising characteristic, an advertising message, a help message, a program choice, a music genre, channel favorites, a media library, an audio volume, an audio balance, an audio equalization, an audio mode, a video mode, a receiver configuration, a media source, or a television channel.

Figure 5:
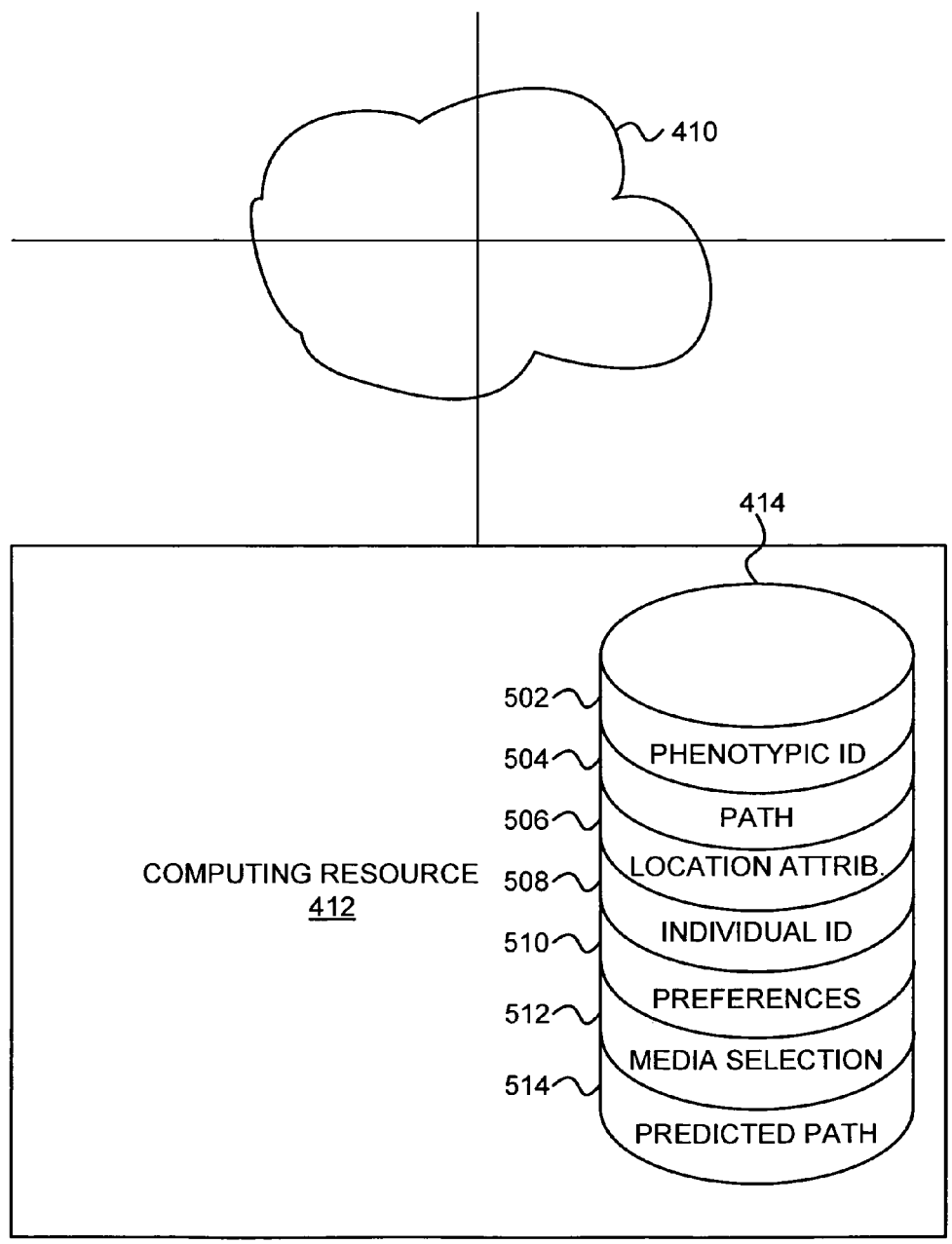
FIG. 5 is a block diagram including a computing resource showing data that can be carried by a non-transient computer readable medium.

FIG. 5 is a block diagram including the computing resource 412, showing data that can be carried by a non-transient computer readable medium 414. The operation of the system 401 is described below by reference to FIGS. 4 and 5. The computing resource 412 can be further configured to determine or infer one or more preferences, interests, or consumer characteristics of the at least one person 112, and select at least one media parameter for one or more media output apparatuses 408a, 408b responsive to the received or inferred one or more preferences, interests, or consumer characteristics. For example, the phenotypic identities 112' or individual identities of persons 112 determined from the MIR signals or data can be carried as data 502 on the non-transient computer readable medium 414. The computing resource 412 may also record and/or read path or path characteristic data 504 carried by the computer readable medium 414.

Based on the data 504 corresponding to the path or path characteristics 406 the computing resource can infer one or more preferences, interests, or consumer characteristics corresponding to the person 112. For example, the regions 402, 404 may have known or inferred characteristics. The region characteristics can be referred to as location attributes. The path or path characteristic 406 can be correlated to at least one location attribute 506 corresponding to at least one previously visited region 402 to determine or infer the one or more preferences, interests or consumer characteristics. As shown in FIG. 5, the computing resource 412 can be configured to read the at least one location attribute 506 from the non-transient computer readable medium 414. Alternatively or additionally, the computing resource can receive the at least one location attribute from a remote resource via a network 410.

For example, a location attribute can include one or more of a business located proximate the region 402, a business type located proximate to the region 402, a service offered proximate to the region 402, a product offered proximate to the region 402, a parameter of media presented proximate to the region 402, media content presented proximate to the region 402, an exhibit proximate to the region 402, a map proximate to the region 402, a view from the region 402, a utility proximate to the region 402, an apparatus proximate to the region 402, a door or passage proximate to the region 402, a gaming designation corresponding to the region 402, a social environment corresponding to the region 402, or an activity associated with the region 402. For example, if a person has a corresponding path 504 that indicates previously visiting regions whose location attributes include proximity to bookstores, the computing resource 412 can infer that the person 112 has an interest in books, and could respond favorably to an advertisement for an online bookstore. In another example, if a person 112 spent a short time in a region 402 having a corresponding location attribute 506 indicating a nearby restaurant, the computing resource 412 might infer that the person may be hungry, and may respond favorably to an advertisement for another nearby restaurant.

The computing resource 412 can be configured to infer one or more preferences, interests, or consumer characteristics responsive to one or more time durations that the at least one person 112 remained in at least one previously visited region 402. Lingering in a region 402 may indicate interest in something associated with the region. Similarly, the computing resource 412 can be configured to infer one or more preferences, interests, or consumer characteristics responsive to one or more movements of the at least one person in at least one previously visited region 402. For example, standing still near the door of the restaurant referenced above, may indicate that the person had read the menu and considered whether to enter and eat. The computing resource 412 can be configured to infer one or more preferences, interests, or consumer characteristics responsive to one or more physiological or physical characteristics exhibited by the at least one person while in the at least one previously visited region 402. Similarly, a time of transit of the at least one person between discontinuous regions 402, 404 can be used by the computing resource 412 to infer one or more preferences, interests, or consumer characteristics. For example, person in a hurry can be less responsive to an advertising message or may prefer receiving terse prompts compared to a person who takes a longer time to travel between regions 402, 404, who may be more receptive to an advertising message, or who may prefer or be in need of more verbose prompts. For example, slower travel between regions 402, 404 could be indicative of a need for directions, which the computing resource 412 can cause to be offered on the media output apparatus 408b.

As indicated above, the computing resource 412 can cooperate with MIRs 101a, 101b to determine a phenotypic identity 112' of a person 112. Generally, a phenotypic identity includes observable characteristics of a person, and can include physical and/or physiological attributes that are captured by an MIR 101. Signals or data received from at least a portion of the plurality of MIRs 101a, 101b can include one or more of attributes of the at least one person 112. The computing resource 412 can be configured to construct a phenotypic profile from the attributes, and either save or convert the phenotypic profile to a new phenotypic identity (if no match is attempted or found) or match the phenotypic profile to at least one previously known or cataloged phenotypic identity 112' corresponding to the one or more attributes.

A phenotypic identity can be unique across a range of regions 402, 404 accessed or monitored by the MIRs 101a, 101b, or, especially in systems 101 that measure a large area or large crowds, more than one person 112 can correspond to the same phenotypic identity, at least for phenotypic identities that include a relatively small number of attributes. A greater number of attributes and/or a longer observation time can be used to determine more phenotypic identity variables, and help to differentiate between individuals. Similarly, determination or inference of a plurality of paths 406 can help to differentiate between similar phenotypic identities.

Depending on the application, it may be desirable to select a phenotypic identity or individual identity from among a small number (e.g., two) or a relatively large number of persons. For a small relevant population, a small number of attributes can be sufficient to differentiate between the persons. For example, body size alone could be sufficient to determine whether a person is an adult or a child. For a larger relevant population, a larger number of attributes can typically be determined to provide a relatively high probability of an accurate determination and/or differentiation between persons.

According to an embodiment, the one or more attributes of the at least one person can include at least one physical attribute and at least one physiological attribute. For example a physical attribute can include at least one of body size, body mass, height, body shape, posture, body permittivity, associated articles, and/or detectable body ornamentation. The attributes can include a characteristic movement such as a characteristic voluntary movement or a characteristic involuntary movement. The characteristic movement can include a reactive movement. A physiological attribute can include at least one of heart rate, an intracyclic heartbeat characteristic, breathing rate, a rate or magnitude of inhalation, a rate or magnitude of exhalation, a tremor of all or part of a body, an intracyclic breathing characteristic, or an intercyclic breathing characteristic. According to embodiments, the phenotypic identity can include data corresponding to one or more of a size of a person, a shape of a person, density of a person, detectable ornamentation associated with a person, detectable clothing worn by a person, a heart size, a posture, a head-to-body size ratio, body movements, an in utero fetus, a prosthesis, a personal appliance, a heart rate, a heart arrhythmia, a respiration rate, a respiration irregularity, a diaphragm motion, a diaphragm spasm, and/or a detectable health attribute. In other words, the phenotypic identity can include data corresponding to the detected physical attributes and/or physiological data. For example, a phenotypic identity can include structured data corresponding to "gender: male, carrying: cell phone, glasses, heart rate: 60-65, height: 6'-2"; or "gender: female, carrying: computer, fetus $2^{nd}$ trimester, heart rate: 55-60, height: 5'-6"."

Additionally or alternatively, the signals or data received from at least a portion of the plurality of MIRs 101a, 101b can include at least one phenotypic identity 112' corresponding to the at least one person 112. That is, the MIRs 101 can do some or all of the signal analysis necessary to extract attributes corresponding to the person 112, and construct a phenotypic profile. Typically, a phenotypic profile can be a structured set of data listing attributes and/or probabilities of attributes. The MIR 101 can match the attributes to an existing phenotypic identity 112' or create a new phenotypic identity 112', and transmit the phenotypic identity 112' to the computing resource 412. Correlation of the signals or data from the MIR(s) 101 to at least one phenotypic identity 112' or at least one individual identity can includes at least one of accessing a database or a look-up table, illustrated as sections 502, 508 of the computer readable medium 414.

However the phenotypic identity 112' is determined, the phenotypic identity 112' can be written as a stored phenotypic identity 502 in one or more non-transient computer readable medium 414 in or operatively coupled to the computing resource 412. The computing resource 412 can optionally determine at least one individual identity 508 corresponding to the at least one phenotypic identity 112'. Individual identities in an identification library can correspond to assigned individual characteristics not correlated to actual known identities of individuals. For example, the plurality of individual identities can correspond to individual aliases representative of individual persons. Alternatively, the plurality of individual identities can correspond to actual known identities of individuals.

Correlating MIR-captured attributes to a phenotypic identity and/or correlating the phenotypic identity to an individual identity can include accessing a database or a look-up table. For example the database or look-up table can include records corresponding to phenotypic identities 502 that include cells providing physical, physiological, and other attributes such as those listed above. Attributes can be compared to determine a best fit from among the records 502. Similarly, a phenotypic identity 502 can be compared to known phenotypic identities to determine a best fit to an individual identity 508. The best fit record can also include a person's name, one or more cells that act as an index to a person's preferences, and/or other indicators of the individual person. According to embodiments, correlating the temporary identity to an individual identity does not necessarily require determining information that can explicitly identify the person (e.g., provide an actual identity), because in some applications all that is required is the determination of preferences corresponding to the individual identity. Thus, the "individual identity" can include an index number, and the person can remain anonymous to the system; or it can include a conventional identity including the person's name, for example.

Upon determining an individual identity 508, the computing resource 412 can access one or more preferences 510 corresponding to the at least one individual identity 508. The preferences 510 can include previously inferred preferences corresponding to the individual identity or, in cases where the individual identity is correlated to an actual person, can include preferences previously entered by the person, or mined from data related to the person's previous activities.

Alternatively or additionally, the computing resource 412 can determine a media selection 512, which can include media parameters predicted from the preferences, and/or can include a media file or stream that the person has been recently receiving.

FIG. 6 is a diagram illustrating a system for tracking the motion of a person including previously visited region(s) 402, a currently visited region 404, and possible future regions 602, 604, according to an embodiment. Referring to FIGS. 4-6, the computing resource 412 can also formulate one or more predicted paths 514a, 514b, 514c from the current path 504 (which can include an accumulation of previous paths) and/or from the preferences 510. The predicted path 514 can include at least one arrival time of the at least one person at a future region 602. For example, if a previous path 406 was found to correspond to a direct (e.g. short duration) transit from a first region 402 to a second region 404 (in contrast to more circuitous or slower transits 406b, 406c), then the computing resource 412 can predict that the person 112 will similarly take a direct path 514a to the predicted future region 602, rather than a more circuitous or slower path 514b, 514c.

According to an embodiment, the computing resource can determine a media parameter that includes a media output start time corresponding to the predicted time of arrival of the at least one person 112 to a vicinity 602 of the media output apparatus 408*f*. Similarly, the computing resource 412 can also determine one or more other media parameters with which to operate the media output apparatus 408*f* to output media to the predicted region 602.

The computing resource 412 can predict a plurality possible future regions 602, 604 that will be visited by the at least one person 112, and receive MIR 101*f*, 101*g* signals or data from the plurality of possible future regions 602, 604 to determine an actually visited one of the possible future regions 602. The computing resource 412 can then predict another future path (not shown) responsive to the actually visited region 602. The actually taken path 514*a* can be combined with other actual paths 504 in the computer-readable media 414. The process can be repeated as the person 112 transits an area corresponding to a plurality of regions 402, 404, 602, 604.

The media parameter(s) determined by the computing resource 412 can include directions to another location. For example, the computing resource 412 can be configured to infer or determine preferences, interests, or consumer characteristics of the at least one person 112, and output directions to or a suggestion to visit one or more other regions of interest. The other region(s) of interest can, for example, offer a product or service similar to a previously visited region where the person lingered or otherwise showed an interest. If a person lingered in or near a previous region characterized by a pleasing view, the computing resource 412 can cause a subsequent media output apparatus 408 to suggest a route to another location with a view. If a person previously was in a space characterized by high activity, the computing resource 412 can cause a subsequent media output apparatus 408 can suggest alternative routes to a restroom and a quiet sitting area.

Correlating the signals or data from the MIR(s) 101 to at least one phenotypic identity 112' or at least one individual identity can include selecting from a limited set of phenotypic or individual identities. The limited set of individual identities can, for example, be associated with an occupancy record of persons in or anticipated to be in a region 402, 404, 602 accessed by the MIR 101. The computing resource can be further configured to generate an occupancy record for the person 112, the occupancy record including a position of the person, a speed of the person, a velocity of the person, a direction of motion of the person, an orientation of the person, a time associated with presence of the person, a time of arrival of the person to a region, a time of departure of the person from the region, and/or the path of the person through the plurality of regions. Optionally, the computing resource 412 can send the occupancy record to a third party or external database and/or combine the occupancy record with another occupancy record associated with the person 112.

Optionally, the computing resource 412 can be further configured to flag a phenotypic identity 112' or individual identity as "in-use" during a time period in which the phenotypic identity 112' or individual identity is present in one of the plurality of regions 402, 404, 602. According to an embodiment, the "in-use" flag is applicable to one of the plurality of regions 404 where the phenotypic identity or individual identity is present. The computing resource 412 can then perform analysis on a subsequent MIR signal or data to determine that the phenotypic identity 112' or individual identity is no longer present in the region 404, and remove the "in use" flag from the individual identity (or phenotypic identity).

Alternatively, the "in-use" flag can apply across a subset greater than one or all of the plurality of regions. The computing resource 412 can be configured to exclude individual identities having "in use" flags during the correlation of at least one phenotypic identity 112' to at least one individual identity. In applications where phenotypic identities 112' are uniquely associated with an individual identity, this can reduce processing requirements by excluding individual identities that have already been determined to be present.

Alternatively, the computing resource 412 can use an "in-use" flag to track intersecting paths taken by persons 112 having similar phenotypic expressions. For example, the computing resource 412 can be configured to infer departure paths 514*a*, 514*b*, 514*c* taken by similar "in-use" phenotypic identities from a region 404 responsive to arrival paths 406, 406*b*, 406*c* taken by the similar "in-use" phenotypic identities to the region 404. Thus, if two persons having similar height, weight, body mass index, detectable ornamentation, heart rate, and walking pace pass one another in or between regions 402, 404, 602, the computing resource 412 can infer that the persons likely continued along a direction similar to their respective earlier directions. Thus, the computing resource 412 can infer or determine a plurality of independent paths 406 of a plurality of persons 112 corresponding to phenotypic identities 112' or individual identities between a plurality of regions 402, 404. In this way, the computing resource 412 can keep track of the paths taken by the two individual persons.

According to an embodiment, the correlation of the signals or data to at least one phenotypic identity 112' or at least one individual identity includes performing a joint fit of two or more sets of human attributes included in the signals or data to a plurality of phenotypic identities. Similarly, the correlation of the signals or data to at least one phenotypic identity 112' or at least one individual identity can include performing a joint fit of two or more sets of phenotypic identities 112' included in the signals or data to a plurality of individual identities.

Figure 7A:
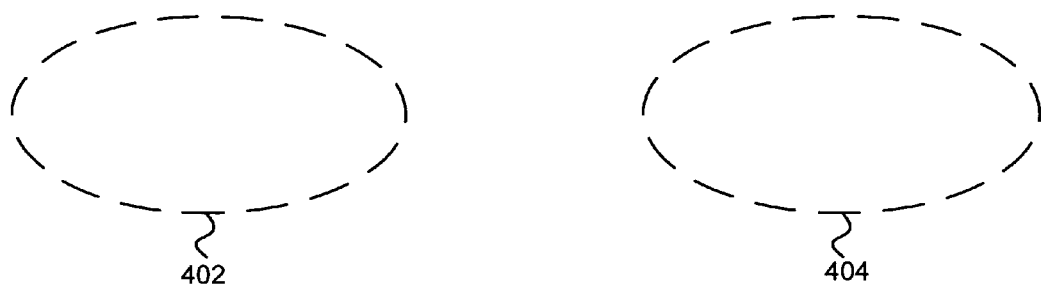
FIG. 7A illustrates an arrangement where at least two regions accessed by respective MIRs are separated and substantially not overlapping.
Figure 7B:
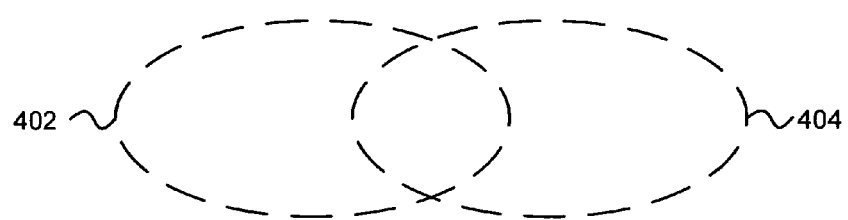
FIG. 7B illustrates an arrangement where at least two regions accessed by respective MIRs are overlapping.
Figure 7C:
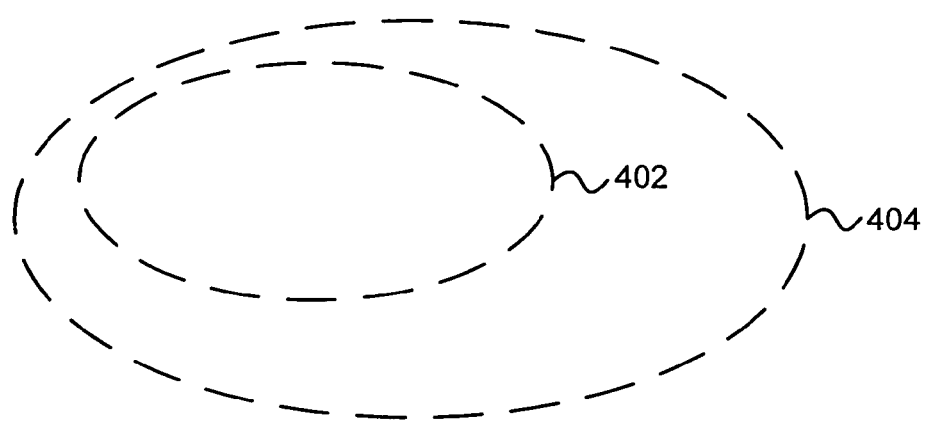
FIG. 7C illustrates an arrangement where at least one region accessed by an MIR is a subset of another regions accessed by another MIR.
Figure 7D:
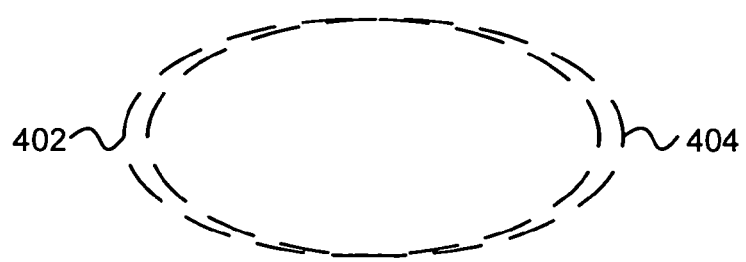
FIG. 7D illustrates an arrangement where a first region accessed by a first MIR and a second region accessed by a second MIR are substantially coincident.

The regions 402, 404, 602 can be arranged in various ways. FIG. 7A illustrates an arrangement where at least two of the plurality of regions 402, 404 are separated and substantially not overlapping. FIG. 7B illustrates an arrangement where at least two of the plurality of regions 402, 404 are overlapping. FIG. 7C illustrates an arrangement where at least one of the plurality of regions 402 is a subset of another of the plurality of regions 404. FIG. 7D illustrates an arrangement where a first of the plurality of regions 402 and a second of the plurality of regions 404 are substantially coincident. Additionally, one or more of the plurality of regions 402 can be in motion relative to another of the plurality of regions 404.

For example, this can occur when a region 402 accessed by a MIR 101 includes all or a portion of a car, bus, train, boat, airplane, or other moving platform.

Figure 8:
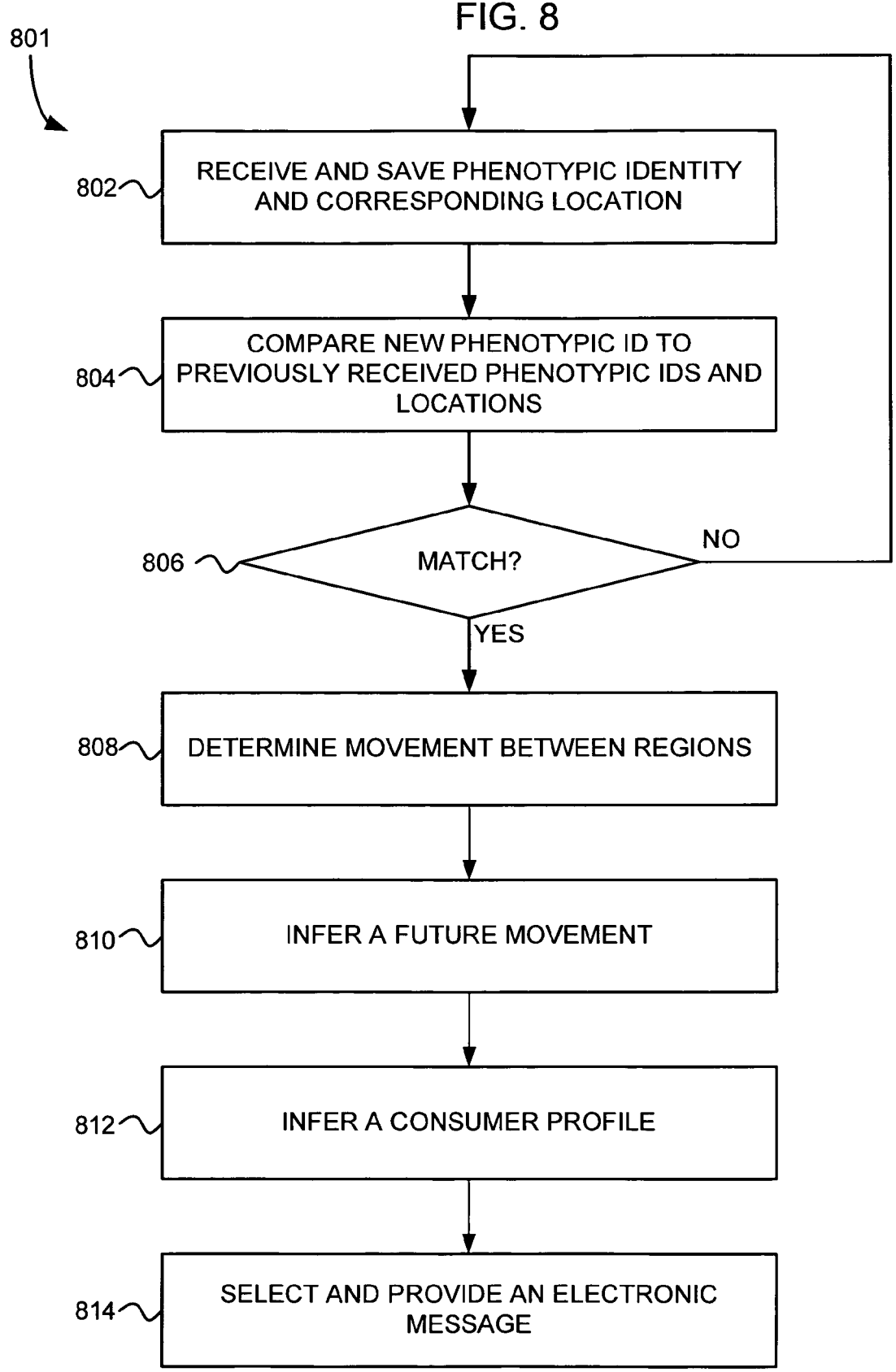
FIG. 8 is a flow chart illustrating a method for tracking the motion of persons using MIRs, according to an embodiment.

FIG. 8 is a flow chart illustrating a method 801 for tracking the motion of persons using MIRs, according to an embodiment. Starting with step 802, a new or second human phenotypic identity is extracted from a MIR signal from a second region. Step 802 can include probing the second region with a MIR, receiving scattered MIR radiation from the second region with a receiver, and generating the MIR signal from the received scattered MIR radiation. The MIR signal can include information related to attributes of a person. As described above in conjunction with FIGS. 1-3, the MIR signal can be analyzed to extract the attributes. The attributes can be formatted to create a phenotypic profile and/or a phenotypic identity. The phenotypic identity and location or designation of the region is saved.

Proceeding to step 804, the second phenotypic identity is compared to one or more first phenotypic identities previously extracted from at least one MIR signal from at least one first region. Proceeding to step 806, if a correlation was made between the second phenotypic identity and at least one first phenotypic identity, the process 801 proceeds to step 808. If no correlation is made, the process can loop to step 802. If, at step 806, it is determined that a correlation between the second phenotypic identity and one or more first phenotypic identities was made, the correlated phenotypic identities are used, in step 808, to determine movement between the first and second regions by a person corresponding to the second (and first) phenotypic identity.

The phenotypic identity or identities extracted from the MIR signal in step 802 can correspond to attributes of a person that is in the region. For example the MIR signal or data can include one or more of a size of a person, a shape of a person, density of a person, detectable ornamentation associated with a person, detectable clothing worn by a person, a heart size, a posture, a head-to-body size ratio, body movements, an in utero fetus, a prosthesis, a personal appliance, a heart rate, heart arrhythmia, a respiration rate, a respiration irregularity, a diaphragm motion, a diaphragm spasm, or a detectable health attribute. A phenotypic identity can be associated with at least one physical attribute and at least one physiological attribute.

The one or more first phenotypic identities compared to the second phenotypic identity in step 804 can be extracted from the at least one MIR signal from the at least one first region. Additionally or alternatively, the one or more first phenotypic identities or corresponding individual identities can be received via a computer network. The phenotypic identities can be compared by performing a statistical analysis of similarities between phenotypic identities and/or by performing a statistical analysis of differences between phenotypic identities.

Step 804 can include correlating the second phenotypic identity to at least one of the one or more first phenotypic identities by performing a joint fit of two or more first phenotypic identities to two or more second phenotypic identities. Optionally, the second phenotypic identity can be correlated to an individual identity of a person. Accordingly, the second and at least one first phenotypic identities can be compared by comparing correlated individual identities.

Proceeding to step 808, movement by the person between the at least one first and the second region is determined. Step 808 can include correlating the movement between regions to at least one time of movement or time interval between presence in the regions. For example, correlating to determine movement can include selecting phenotypic identities to maximize similarities or minimize differences according to a joint fit between a plurality of second phenotypic identity and two or more first phenotypic identities.

According to some embodiments, the second region and the at least one first region can be substantially non-overlapping. For example the second region and the at least one first region can be separated by a distance greater than or equal to the physical extents of the first and second regions. Step 808 can include determining, from the time or time interval and one or more physical distances between the regions, one or more speeds of travel of the person.

Optionally, the process 801 can proceed to step 810, where a future movement such as a future path and/or speed of the person can be inferred from the time or time interval between the person being in the regions and one or more physical distances between the regions.

Proceeding to step 812, a consumer profile for the person corresponding to the second phenotypic identity is inferred. For example, the consumer profile can be inferred from a time or time interval of travel between at least the first region and the second region and one or more product displays or advertisements at or between the regions.

The consumer profile can be based on an inference of the person lingering at or near product displays or advertisements. Optionally, the consumer profile can be based on a history of movements of the person. Optionally, the consumer profile can be based on a transaction history, detected behavior in at least one first or the second region, or movement between the regions of the person corresponding to the second phenotypic identity. The consumer profile can include a prediction of purchasing behavior.

Proceeding to step 814, an advertisement or product display likely to receive a positive response from the person (based on the consumer profile) can be selected and provided to the person. Optionally, step 814 can include providing electronic guidance to direct the person to a location corresponding to a product or service indicated by the consumer profile.

Figure 9:
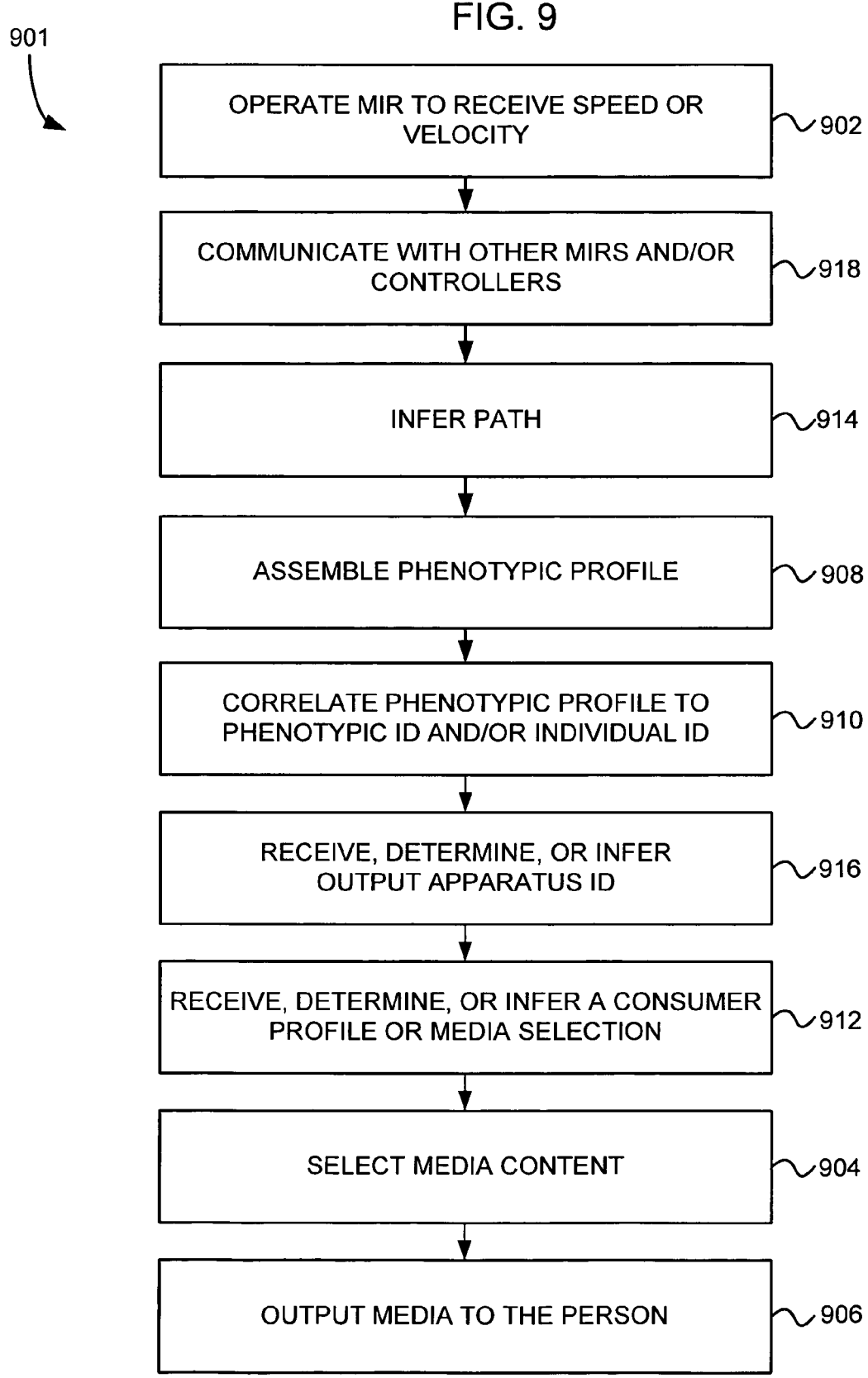
FIG. 9 is a flow chart showing a method for detecting a speed or velocity associated with a person with a MIR, and selecting media content for output to the person, according to an embodiment.

While description above has primarily focused on determining movement of a person by determining timing with which the person is detected in two or more regions by a MIR, an MIR can also determine movement of a person within a single region. The movement detected in a single region can optionally be combined with information derived from other regions, or can be used in the absence of "neighboring" region information to infer a preference, response, and/or consumer profile of the person. One or more media output apparatuses can then be used to present helpful and/or commercial information to the person. With reference to FIG. 9, a process 901 starts with step 902, wherein a MIR can be operated to detect a speed or velocity associated with a person. For example, referring to FIG. 1, determining the speed or velocity of the person 112 can include comparing successive ranges of the person. As a person 112 moves toward or away from the transmitting antenna 104 and receiving antenna 114, attenuation or reflection of the micro-impulse will occur respectively earlier or later relative to a given range delay.

Alternatively, determining the speed or velocity of the person 112 can include measuring at least one Doppler shift corresponding to the person. That is, a person 112 moving away from the transmitting antenna 104 and receiving antenna 114 will reflect a micro-impulse such that frequency components of the backscattered micro-impulse are red-shifted. Similarly, a person 112 moving toward the transmitting antenna 104 and receiving antenna 114 will reflect a micro-impulse such that frequency components of the back-scattered micro-impulse are blue-shifted. The speed or velocity of the person 112 can be determined at least in part from the red-shift or blue-shift of the micro-impulse. Alternatively, backscatter from the transmitted micro-impulse can be received through two or more receiving antennas 114, 114*b* separated from one another. The speed or velocity of the person 112 can be determined by comparing successive positions or Doppler shifts corresponding to the person relative to the two or more receiving antennas 114, 114*b*. In a way, this can be viewed as triangulating the successive positions or successive speed or velocity components. Similarly, according to a configuration not shown in FIG. 1, the speed or velocity of the person 112 can be determined by comparing successive positions or Doppler shifts corresponding to the person relative to two or more transmitting antennas 104. This can also be viewed as triangulating the successive positions or successive speed or velocity components.

Proceeding to step 904, media content is selected for display to the person responsive to the velocity or speed associated with the person. Optionally, step 904 can include outputting a query statement including data corresponding to the speed or velocity, and receiving a consumer profile or media selection responsive to the query statement.

Next, at step 906, a media output apparatus is controlled to output the media content to the person. For example, the media output apparatus can include one or more of a video display, a static electronic display, a loudspeaker, or a personal media player.

Optionally, the process 901 can include selecting at least one media parameter other than media content. Example media parameters are described above.

Optionally, step 902 can include detecting a plurality of human attributes corresponding to the person. The plurality of human attributes can include at least one physical attribute and at least one physiological attribute. Human attributes are described above. After step 902, the process can proceed to optional step 908 where one or more human attributes are assembled into a phenotypic profile. The phenotypic profile can also include the speed or velocity of the person. The process 901 can then proceed to optional step 910, where the phenotypic profile is correlated to a phenotypic identity or individual identity corresponding to the person.

Next, optional step 912 can include outputting a query statement including data corresponding to the phenotypic profile, phenotypic identity, or individual identity, and receiving a consumer profile or media selection responsive to the query statement. Step 904 can thus include selecting the media content responsive to the phenotypic profile, phenotypic identity or individual identity.

Optionally, the process 901 can include selection of a media output apparatus that best corresponds to a path taken by the person. Optional step 914 includes inferring or determining a path of the person. Optional step 916 then includes receiving, determining, or inferring an apparatus identity. This can be used to select one or more of a plurality of media output apparatuses. For example, step 916 can include outputting a query statement including data corresponding to the speed or velocity, and receiving an output apparatus identity responsive to the query statement. Step 906 can thus include causing the media to be output to the person responsive to the apparatus identity. For example, the media output apparatus identity can correspond to a media output apparatus positioned to be seen or heard by the person after the person moves away from the MIR. Additionally or alternatively, step 906 can include causing the media to be output on a media output apparatus positioned to be seen or heard by the person as the person travels along a path inferred from one or more of the speed, velocity, or a consumer profile.

Optionally, the process 901 can include step 918 of receiving data from or otherwise communicating with other MIRs and/or other controllers. For example, step 918 can include operating one or more second MIRs to detect a second speed or velocity associated with the person, transmitting the speed or velocity to one or more second controllers, or receiving a second speed or velocity from one or more second controllers. Step 914 can thus include cooperating with one or more second MIRs or controllers to plot a path traveled by at least the person. Step 916 can include cooperating with one or more second MIRs or controllers to select a media output apparatus responsive to the speed or velocity and/or path information determined in step 914.

Similarly, step 912 can include cooperating with one or more second MIRs or controllers to cause the media to be output to the person responsive to a consumer profile, or a media selection selected responsive to the speed or velocity.

According to embodiments, the process 901 can include tracking the speed or velocity of a plurality of persons substantially simultaneously. The plurality of persons can then have media content selected and directed to an appropriate media output apparatus as a function of the MIR data and/or information sent to or received from other MIRs and/or controllers.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed:

1. A system for tracking a path of a person, comprising:
a plurality of micro-impulse radars configured to probe a plurality of regions including a first region and a second region; and
a computing resource operatively coupled to the plurality of micro-impulse radars;
wherein the computing resource is configured to:
receive signals or data from at least some of the plurality of micro-impulse radars,
correlate the signals or data to at least one phenotypic identity or at least one individual identity, and
infer or determine a path or a path characteristic between the first and second regions taken by at least one person corresponding to the at least one phenotypic identity or individual identity; and
a first media output apparatus operatively coupled to the computing resource and configured to output media to the at least one person in the first region;
a second media output apparatus operatively coupled to the computing resource and configured to output media to the at least one person in the second region;
wherein the computing resource is configured to select at least one media parameter for the first or second media output apparatus responsive to the inferred or determined path or path characteristic, the at least one parameter including time synchronization for the output media of the first media output apparatus and the second media output apparatus, and to operate the second media output apparatus according to the at least one media parameter.

2. The system for tracking a path of a person of claim 1, wherein the computing resource is further configured to select a media source or transmit media corresponding to the at least one media parameter to the first and second media output apparatuses.

3. The system for tracking a path of a person of claim 1, wherein the computing resource is further configured to cause the first and second media output apparatuses to output the media to the at least one person.

4. The system for tracking a path of a person of claim 1, wherein the at least one media parameter includes one or more of a configuration corresponding to an instance of a presence of the at least one person in a previously visited region, time synchronization of a media file or media stream with the media file or media stream output to the at least one person in a previously visited region, an advertising characteristic, an advertising message, a help message, a program choice, a music genre, channel favorites, a media library, an audio volume, an audio balance, an audio equalization, an audio mode, a video mode, a receiver configuration, a media source, or a television channel.

5. The system for tracking a path of a person of claim 1, wherein the each of the first and second media output apparatuses includes one or more of a portable media player, an electronic display, configurable signage, a video screen, or a loudspeaker.

6. The system for tracking a path of a person of claim 1, wherein the computing resource is further configured to determine or infer one or more preferences, interests, or consumer characteristics of the at least one person, and select at least one media parameter for the first or second media output apparatuses responsive to the received or inferred one or more preferences, interests, or consumer characteristics.

7. The system for tracking a path of a person of claim 6, wherein the computing resource is configured to infer one or more preferences, interests, or consumer characteristics responsive to at least one location attribute corresponding to at least one previously visited region.

8. The system for tracking a path of a person of claim 7, wherein the computing resource is configured to read the at least one location attribute from a non-transient computer storage medium or receive the at least one location attribute from a remote resource.

9. The system for tracking a path of a person of claim 7, wherein the at least one location attribute includes one or more of a business located proximate the first or second region, a business type located proximate to the first or second region, a service offered proximate to the first or second region, a product offered proximate to the first or second region, a parameter of media presented proximate to the first or second region, media content presented proximate to the first or second region, an exhibit proximate to the first or second region, a map proximate to the first or second region, a view from the first or second region, a utility proximate to the first or second region, an apparatus proximate to the first or second region, a door or passage proximate to the first or second region, a gaming designation corresponding to the first or second region, a social environment corresponding to the first or second region, or an activity associated with the first or second region.

10. The system for tracking a path of a person of claim 6, wherein the computing resource is configured to infer one or more preferences, interests, or consumer characteristics responsive to one or more time durations that the at least one person remained in at least one previously visited region.

11. The system for tracking a path of a person of claim 6, wherein the computing resource is configured to infer one or more preferences, interests, or consumer characteristics responsive to one or more movements of the at least one person in at least one previously visited region.

12. The system for tracking a path of a person of claim 6, wherein the computing resource is configured to infer one or more preferences, interests, or consumer characteristics responsive to one or more physiological or physical characteristics exhibited by the at least one person while in the at least one previously visited region.

13. The system for tracking a path of a person of claim 6, wherein the computing resource is configured to infer one or more preferences, interests, or consumer characteristics responsive to a time of transit of the at least one person between discontinuous regions.

14. The system for tracking a path of a person of claim 1, wherein the signals or data received from at least a portion of the plurality of micro-impulse radars include one or more of attributes of the at least one person; and wherein the computing resource is configured to determine at least one phenotypic identity corresponding to the one or more attributes.

15. The system for tracking a path of a person of claim 14, wherein the one or more attributes includes at least one of body size, body mass, height, body shape, posture, body permittivity, associated articles, or detectable body ornamentation.

16. The system for tracking a path of a person of claim 14, wherein the one or more attributes includes a characteristic movement.

17. The system for tracking a path of a person of claim 14, wherein the one or more attributes includes at least one of heart rate, an intracyclic heartbeat characteristic, breathing rate, a rate or magnitude of inhalation, a rate or magnitude of exhalation, a tremor of all or part of a body, an intracyclic breathing characteristic, or an intercyclic breathing characteristic.

18. The system for tracking a path of a person of claim 14, wherein the one or more attributes includes at least one physical attribute and at least one physiological attribute.

19. The system for tracking a path of a person of claim 1, wherein the computing resource is configured to determine at least one individual identity corresponding to the at least one phenotypic identity.

20. The system for tracking a path of a person of claim 19, wherein the computing resource is further configured to access one or more preferences corresponding to the at least one individual identity.

21. The system for tracking a path of a person of claim 1, wherein the computing resource is further configured to predict at least one arrival time of the at least one person at a future region.

22. The system for tracking a path of a person of claim 21, wherein the at least one media parameter includes a media output start time corresponding to the predicted time of arrival of the at least one person to a vicinity of the second media output apparatus.

23. The system for tracking a path of a person of claim 1, wherein the computing resource is further configured to predict at least one future path or path characteristic of the at least one person to a predicted region.

24. The system for tracking a path of a person of claim 23, further comprising:
a third media output apparatus configured to output media to the predicted region.

25. The system for tracking a path of a person of claim 23, wherein the computing resource is further configured to predict a plurality possible future regions that will be visited by the at least one person, receive micro-impulse radar signals or data from the plurality of possible future regions to determine an actually visited one of the possible future regions, and predict another future path responsive to the actually visited region.

26. The system for tracking a path of a person of claim 1, wherein the computing resource is configured to infer or determine preferences, interests, or consumer characteristics of the at least one person, and output directions to or a suggestion to visit one or more other regions of interest.

27. The system for tracking a path of a person of claim 1, wherein correlating the signals or data to at least one phenotypic identity or at least one individual identity includes selecting from a limited set of phenotypic or individual identities.

28. The system for tracking a path of a person of claim 27, wherein the limited set of individual identities is associated with an occupancy record of persons in or anticipated to be in a region accessed by at least one micro-impulse radar.

29. The system for tracking a path of a person of claim 1, wherein the computing resource is further configured to generate an occupancy record for the person, the occupancy record including at least one of a position of the person, a speed of the person, a velocity of the person, a direction of motion of the person, an orientation of the person, a time associated with presence of the person, a time of arrival of the person to a region, a time of departure of the person from a region, and the path of the person through the plurality of regions.

30. The system for tracking a path of a person of claim 29, wherein the computing resource is further configured to send the occupancy record to a third party or external database.

31. The system for tracking a path of a person of claim 29, wherein the computing resource is further configured to combine the occupancy record with another occupancy record associated with the person.

32. The system for tracking a path of a person of claim 1, wherein the correlation of the signals or data to at least one phenotypic identity or at least one individual identity includes at least one of accessing a database or a look-up table.

33. A method for tracking the movement of a person, comprising:
generating a plurality of micro-impulse radar signals;
extracting a first human phenotypic identity from a micro-impulse radar signal from a first region;
determining an individual identity of the person by correlating the phenotypic identity to the individual identity in an identification library;
extracting a second human phenotypic identity from a second micro-impulse radar signal from a second region;
comparing the first phenotypic identity to the second phenotypic identity;
correlating the first phenotypic identity to the second phenotypic identity to determine movement between regions by the person corresponding to the individual identity; and
operating a first media output apparatus to output a media file or media stream with the media file or media stream output to the first region;
operating a second media output apparatus to output the media file or media stream with the media file or media stream output to the second region in a manner that corresponds with a media parameter selected based on the determined movement between the regions by the person, the media parameter also corresponding to synchronization of the media file or media stream with the media file or media stream output to the person.

34. The method for tracking the movement of a person of claim 33, wherein one or more of the first or second phenotypic identities or corresponding individual identities are received via a computer network.

35. The method for tracking the movement of a person of claim 33, wherein the second region and the first region are substantially non-overlapping.

36. The method for tracking the movement of a person of claim 33, wherein the second region and the first region are separated by a distance greater than or equal to the physical extents of the first and second regions.

37. The method for tracking the movement of a person of claim 33, further comprising:
correlating the second phenotypic identity to an individual identity of a person.

38. The method for tracking the movement of a person of claim 37, wherein the first and second phenotypic identities are compared by comparing correlated individual identities.

39. The method for tracking the movement of a person of claim 33, further comprising:
correlating the movement between regions by the person corresponding to the individual identity to at least one time of movement or time interval between presence in the regions.

40. The method for tracking the movement of a person of claim 39, further comprising:
determining, from the time or time interval and one or more physical distances between the regions, one or more speeds of travel of the person.

41. The method for tracking the movement of a person of claim 39, further comprising:
inferring from the time or time interval and one or more physical distances between the regions at least one of a future path and speed of travel by the person.

42. The method for tracking the movement of a person of claim 33, further comprising:
inferring, from a time or time interval of travel between the first region and the second region and one or more product displays or advertisements at or between the first and second regions, a consumer profile for the person.

43. The method for tracking the movement of a person of claim 42, wherein the consumer profile is based on an inference of the person lingering at or near product displays or advertisements.

44. The method for tracking the movement of a person of claim 42, wherein the consumer profile is based on a history of movements of the person.

45. The method for tracking the movement of a person of claim 33, further comprising:
inferring or determining a consumer profile of a person corresponding to the individual identity.

46. The method for tracking the movement of a person of claim 45, wherein the consumer profile is based on a transaction history, detected behavior in at least one of the first region or the second region, or movement between the first and second regions of the person corresponding to the individual identity.

47. The method for tracking the movement of a person of claim 45, wherein the consumer profile includes a prediction of purchasing behavior.

48. The method for tracking the movement of a person of claim 45, further comprising:
providing an advertisement or product display to the person likely to receive a positive response based on the consumer profile.

49. The method for tracking the movement of a person of claim 45, further comprising:
providing electronic guidance to direct the person to a location corresponding to a product or service indicated by the consumer profile.

50. The method for tracking the movement of a person of claim 33, wherein the first and second phenotypic identities are compared by performing a statistical analysis of similarities therebetween.

51. The method for tracking the movement of a person of claim 33, wherein the first and second phenotypic identities are compared by performing a statistical analysis of differences therebetween.

52. The method for tracking the movement of a person of claim 33, further comprising:
probing the second region with at least one of the plurality of micro-impulse radar;
receiving scattered micro-impulse radar radiation from the second region; and
generating the second micro-impulse radar signal from the received scattered micro-impulse radar radiation.

53. The method for tracking the movement of a person of claim 33, wherein one or more of the first and second phenotypic identities are associated with at least one physical attribute and at least one physiological attribute.

54. A system for tracking a path of a person, comprising:
a plurality of micro-impulse radars configured to probe a plurality of regions; and
a computing resource operatively coupled to the plurality of micro-impulse radars;
wherein the computing resource is configured to:
receive signals or data from at least some of the plurality of micro-impulse radars,
correlate the signals or data to at least one phenotypic identity or at least one individual identity, and
infer or determine a path or a path characteristic between the regions taken by at least one person corresponding to the at least one phenotypic identity or individual identity; and
a first media output apparatus operatively coupled to the computing resource and configured to output media to the at least one person;
a second media output apparatus operatively coupled to the computing resource and configured to output media to the at least one person;
wherein the computing resource is configured to select at least one media parameter for the second media output apparatus corresponding to synchronization of a media file or media stream with the media file or media stream output to the at least one person during travel thereof.

55. The method for tracking the movement of a person of claim 33, further comprising outputting the media file or media stream with the media file or media stream output to the person from the first region to the second region substantially without interruptions.

* * * * *

UNITED STATES PATENT AND TRADEMARK OFFICE
CERTIFICATE OF CORRECTION

Page 1 of 1

PATENT NO.         : 9,019,149 B2
APPLICATION NO.    : 12/930043
DATED              : April 28, 2015
INVENTOR(S)        : Bangera et al.

It is certified that error appears in the above-identified patent and that said Letters Patent is hereby corrected as shown below:

In the claims

Column 25, line 36, claim 45 delete "inferring or determining a consumer profile of a person" and insert --inferring or determining a consumer profile of the person--

Signed and Sealed this
Ninth Day of February, 2016

Michelle K. Lee
*Director of the United States Patent and Trademark Office*